(12) United States Patent
Naryzhnyy et al.

(10) Patent No.: US 11,847,112 B2
(45) Date of Patent: *Dec. 19, 2023

(54) DECLARATIVE AND UNIFIED DATA TRANSITION

(71) Applicant: NetCracker Technology Corp., Waltham, MA (US)

(72) Inventors: Ilya Georgievich Naryzhnyy, Kursk (RU); Sergey Mikhailovich Vladimirov, Moscow (RU); Nikita Sergeevich Ershov, Cheboksary (RU)

(73) Assignee: NETCRACKER TECHNOLOGY CORP., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,093

(22) Filed: Apr. 18, 2022

(65) Prior Publication Data

US 2022/0253429 A1 Aug. 11, 2022

Related U.S. Application Data

(63) Continuation of application No. 15/185,106, filed on Jun. 17, 2016, now Pat. No. 11,308,072, which is a
(Continued)

(51) Int. Cl.
*G06F 16/23* (2019.01)
*G06F 16/21* (2019.01)
*G06F 16/25* (2019.01)

(52) U.S. Cl.
CPC ........ *G06F 16/2365* (2019.01); *G06F 16/213* (2019.01); *G06F 16/254* (2019.01); *G06F 16/258* (2019.01)

(58) Field of Classification Search
CPC .. G06F 16/2365; G06F 16/213; G06F 16/254; G06F 16/258; G06F 16/25; G06F 16/1794
See application file for complete search history.

(56) References Cited

U.S. PATENT DOCUMENTS 7,673,282 B2 3/2010 Amaru et al.
2004/0083199 A1* 4/2004 Govindugari ......... G06F 16/215
(Continued)

OTHER PUBLICATIONS

Final Office Action on U.S. Appl. No. 15/185,106 dated Jun. 13, 2018.
(Continued)

*Primary Examiner* — Pierre M Vital
*Assistant Examiner* — Cecile H Vo
(74) *Attorney, Agent, or Firm* — FOLEY & LARDNER LLP

(57) ABSTRACT

Described are computer-based methods and apparatuses, including computer program products, for declarative and unified data transition. In some embodiments, a computer implemented method includes determining a unified configuration for a knowledge domain. The unified configuration can include one or more predicates for one or more system objects, and/or one or more relationships between the one or more system objects. The method can include generating one or more transformation rules based on the one or more predicates. The one or more transformations can enable transformation of input data. The input data can include information associated with the one or more system objects and/or the one or more relationships between the one or more system objects. The method can include generating one or more reconciliation rules based on the one or more predicates. The one or more reconciliation rules can be associated with a destination database and can enable reconciliation of the transformed data with the destination database.

25 Claims, 24 Drawing Sheets

Related U.S. Application Data continuation of application No. 13/508,081, filed as application No. PCT/RU2009/000605 on Nov. 9, 2009, now abandoned.

(56) References Cited

U.S. PATENT DOCUMENTS

| | | |
|---|---|---|
| 2005/0055324 A1 | 3/2005 | Godeby et al. |
| 2005/0144166 A1 | 6/2005 | Chapus et al. |
| 2005/0165789 A1* | 7/2005 | Minton ................. G06F 16/986 707/E17.118 |
| 2006/0010195 A1* | 1/2006 | Mamou ................. G06Q 10/10 709/203 |
| 2007/0074155 A1 | 3/2007 | Ama et al. |
| 2008/0031690 A1 | 2/2008 | Krick |
| 2015/0095303 A1 | 4/2015 | Sonmez et al. |

OTHER PUBLICATIONS

Final Office Action on U.S. Appl. No. 15/185,106 dated Jul. 11, 2019.

International Search Report and Written Opinion dated Aug. 5, 2010 in PCT/RU2009/000605 (10 pgs.).

Non-Final Office Action on U.S. Appl. No. 15/185,106 dated Nov. 5, 2018.

Notice of Allowance on U.S. Appl. No. 15/185,106 dated Apr. 2, 2021.

Notice of Allowance on U.S. Appl. No. 15/185,106 dated Apr. 8, 2020.

Notice of Allowance on U.S. Appl. No. 15/185,106 dated Sep. 30, 2020.

Notice of Allowance on U.S. Appl. No. 15/185,106 dated Nov. 13, 2019.

Notice of Allowance on U.S. Appl. No. 15/185,106 dated Dec. 15, 2021.

U.S. Notice of Allowance on U.S. Appl. No. 15/185,106 dated Jul. 30, 2021.

U.S. Office Action on 095841-0112 dated Oct. 2, 2014.

U.S. Office Action on 095841-0112 dated May 18, 2015.

U.S. Office Action on U.S. Appl. No. 15/185,106 dated Jun. 28, 2017.

* cited by examiner

Input Data
600a

BSCBoard

610a
| | FDN | Serial Number | Device |
|---|---|---|---|
| 1 | 123 | 123456 | Dev_1 |
| 2 | 321 | NULL | 1231 |
| 3 | Test | 456879 | Dev_3 |
| 4 | 789 | 123000 | Dev_2 |

BSCFrame

620a
| | FDN | Serial Number | Device |
|---|---|---|---|
| 1 | 000 | 888 | Dev_2 |
| 2 | Test1 | 1,22 | Dev_3 |
| 3 | ½ | Null | 1231 |
| 4 | 951 | 753654 | Dev_2 |

BSCDevice

630a
| | Device |
|---|---|
| 1 | Dev_1 |
| 2 | Dev_2 |
| 3 | Dev_3 |
| 4 | Xyz_3 |
| 5 | 1231 |

FIG. 6A

Unified Configuration
600b

```
<configuration name="MyConfiguration"
    xmlns="http://www.netcracker.com/schemas/mediation/transition">
    <entity-set name="SDB">
        <entity name="BSCBoard">
            <attribute name="FDN"/>
            <attribute name="Serial_Number"/>
            <attribute name="Device" relation="Card to Device"/>
        </entity>
        <entity name="BSCFrame">
            <attribute name="FDN"/>
            <attribute name="Serial_Number"/>
            <attribute name="Device" relation="Card to Device"/>
        </entity>
        <entity name="BSCDevice">
            <attribute name="Device"/>
        </entity>
        <relationship name="Board to Device" multiplicity="0..1" direction="in">
            <source-entity>BSCBoard</source-entity>
            <destination-entity>Device</destination-entity>
        </relationship>
        <relationship name="Frame to Device" multiplicity="0..1" direction="in">
            <source-entity>BSCFrame</source-entity>
            <destination-entity>Device</destination-entity>
        </relationship>
    </entity-set>
    <entity-set name="IDB Entity Set">
        <entity name="Card" pk="Card ID">
            <attribute name="Card ID" type="integer"/>
            <attribute name="Parent ID" type="integer" relation="Card to Device"/>
            <attribute name="Name" type="string"/>
        </entity>
        <entity name="Device" pk="Device ID">
            <attribute name="Device ID" type="integer" relation="Card to Device"/>
        </entity>
        <relationship name="Card to Device" multiplicity="0..1" direction="in">
            <source-entity>Card</source-entity>
            <destination-entity>Device</destination-entity>
        </relationship>
    </entity-set>
</configuration>
```

610b encloses the first entity-set block; 620b encloses the second entity-set block.

FIG. 6B

Validation Rules
600c

```xml
<configuration name="MyConfiguration"
        xmlns="http://www.netcracker.com/schemas/mediation/transition"
        xmlns:v="http://www.netcracker.com/schemas/mediation/transition/validation">
    <entity-set name="SDB">
        <entity name="BSCBoard">
            <attribute name="FDN"/>
            <attribute name="Serial_Number">
                <v:is-not-null name="IsNotNull 1 Validation Rule" majority="major"/>
            </attribute>
            <attribute name="Device" relation="Card to Device"/>
        </entity>
        <entity name="BSCFrame">
            <attribute name="FDN"/>
            <attribute name="Serial_Number">
                <v:is-not-null name="IsNotNull 2 Validation Rule" majority="major"/>
            </attribute>
            <attribute name="Device" relation="Card to Device"/>
        </entity>
        <entity name="BSCDevice">
            <attribute name="Device">
                <v:like name="Like Validation Rule" majority="major">
                    <v:expression>Dev%</v:expression>
                </v:like>
            </attribute>
        </entity>
        <relationship name="Board to Device" multiplicity="0..1" direction="in">
            <source-entity>BSCBoard</source-entity>
            <destination-entity>Device</destination-entity>
        </relationship>
        <relationship name="Frame to Device" multiplicity="0..1" direction="in">
            <source-entity>BSCFrame</source-entity>
            <destination-entity>Device</destination-entity>
        </relationship>
    </entity-set>
</configuration>
```

610c: BSCBoard entity block
620c: BSCFrame entity block
630c: BSCDevice entity block

FIG. 6C

Validated Data
600d

```
         BSCBoard
                FDN    Serial Number    Device
         1      123    123456           Dev_1
610d     2      321    NULL             1231      Deleted according to "IsNotNull 1 Validation Rule"
         3      Test   456879           Dev_3
         4      7891   23000            Dev_2

BSCFrame
                FDN    Serial Number    Device
         1      000    888              Dev_1
         2      Test   11,22            Dev_3
620d     3      ½      Null             1231      Deleted according to "IsNotNull 2 Validation Rule"
         4      951    753654           Dev_2

BSCDevice
                Device
         1      Dev_1
         2      Dev_2
         3      Dev_3
630d     4      Xyz_3           Deleted according to "Like Validation Rule"
640d     5      1231            Deleted according to "Like Validation Rule"
```

FIG. 6D

Transformation Rules 600e

```xml
<configuration name="MyConfiguration"
    xmlns="http://www.netcracker.com/schemas/mediation/transition"
    xmlns:tr="http://www.netcracker.com/schemas/mediation/transition/transformation">
    <entity-set name="IDB Entity Set">
        <entity name="Card" pk="Card ID">
            <attribute name="Card ID">
                <tr:expression transformation="Card Transformation">
                    <tr:source-attribute entity="BSCBoard" name="FDN"/>
                </tr:expression>
            </attribute>
            <attribute name="Parent ID" relation="Card to Device">
                <tr:expression transformation="Card Transformation">
                    <tr:source-attribute entity="BSCBoard" name="Device"/>
                </tr:expression>
            </attribute>
            <attribute name="Name" type="string">
                <tr:expression transformation="Card Transformation" merge-rule="F_SN||'-'|| B_SN">
                    <tr:source-attribute entity="BSCFrame" name="Serial Number" alias="F_SN"/>
                    <tr:source-attribute entity="BSCBoard" name="Serial Number" alias="B_SN"/>
                </tr:expression>
            </attribute>
            <tr:transformation name="Card Transformation">
                <tr:source-entity name="BSCFrame" alias="FRAME"/>
                <tr:source-entity name="BSCBoard" alias="BOARD"/>
                <tr:source-entity name="Device" alias="DEV"/>
                <tr:join-condition name="By Device">
                    <tr:source-attribute>BOARD.Device</tr:source-attribute>
                    <tr:source-attribute>FRAME.Device</tr:source-attribute>
                </tr:join-condition>
                <tr:filter name="Is not null filter" condition="IS NOT NULL">
                    <tr:source-attribute>DEV.Device</tr:source-attribute>
                </tr:filter>
            </tr:transformation>
        </entity>
        <entity name="Device" pk="Device ID">
            <attribute name="Device ID" relation="Card to Device">
                <tr:expression transformation="Device Transformation">
                    <tr:source-attribute entity="Device" name="Device"/>
                </tr:expression>
            </attribute>
            <tr:transformation name="Device Transformation">
                <tr:source-entity name="Device" alias="DEV"/>
                <tr:filter name="Is not null filter" condition="IS NOT NULL">
                    <tr:source-attribute>DEV.Device</tr:source-attribute>
                </tr:filter>
            </tr:transformation>
        </entity>
        <relationship name="Card to Device" multiplicity="0..1" direction="in">
            <source-entity>Card</source-entity>
            <destination-entity>Device</destination-entity>
        </relationship>
    </entity-set>
</configuration>
```

- 610e: Card ID attribute block
- 620e: Parent ID attribute block
- 630e: Name attribute block
- 640e: Card Transformation block
- 650e: Device ID attribute block
- 660e: Device Transformation block

FIG. 6E

Transformed Data
600f

| | Card ID | Parent ID | Name |
|---|---|---|---|
| Card | | | |
| 1 | 123 | Dev_1 | 123456-888 |
| 2 | Test | Dev_3 | 456879-1,22 |
| 3 | 789 | Dev_2 | 123000-753654 |

610f brackets rows 1–3 above.

| | Device ID |
|---|---|
| Device | |
| 1 | Dev_1 |
| 2 | Dev_2 |
| 3 | Dev_3 |

620f brackets rows 1–3 above.

FIG. 6F

Reconciliation Rules
600i

```
<configuration name="MyConfiguration"
        xmlns="http://www.netcracker.com/schemas/mediation/transition"
        xmlns:rec="http://www.netcracker.com/schemas/mediation/transition/reconciliation">
    <entity-set name="IDB Entity Set">
        <rec:target-inventory name="Test Inventory Project" />
        <entity name="Card" pk="Card ID">
            <rec:object-type nc-name="CARD" id="116328" />
            <attribute name="Card ID" type="integer">
                <rec:attr nc-name="CARD_ID" attr-id="1234567" />
            </attribute>
            <attribute name="Parent ID" type="integer" relation="Card to Device">
                <rec:attr nc-name="PARENT_ID" attr-id="1234568" />
            </attribute>
            <attribute name="Name" type="string">
                <rec:attr nc-name="NAME" attr-id="1234569" />
            </attribute>
        </entity>
        <entity name="Device" pk="Device ID">
            <rec:object-type nc-name="DEVICE" id="116329" />
            <attribute name="Device ID" type="integer" relation="Card to Device" />
        </entity>
        <relationship name="Card to Device" multiplicity="0..1" direction="in">
            <source-entity>Card</source-entity>
            <destination-entity>Device</destination-entity>
        </relationship>
    </entity-set>
</configuration>
```

Reconciled Data 600i

NC Object Types

| | Object Type ID | Name |
|---|---|---|
| 1 | 116328 | CARD |
| 2 | 116329 | DEVICE |

NC Attributes

| | Attr ID | Name |
|---|---|---|
| 1 | 1234567 | CARD_ID |
| 2 | 1234568 | PARENT_ID |
| 3 | 1234569 | NAME |

NC Objects

| | Object ID | Name | Object Type ID |
|---|---|---|---|
| 1 | 456 | 123456-888 | 116328 |
| 2 | 457 | 123000-753654 | 116328 |
| 3 | 458 | Dev_1 | 116329 |
| 4 | 459 | Dev_2 | 116329 |

NC Params

| | Attr ID | Object ID | Value |
|---|---|---|---|
| 1 | 1234567 | 456 | 1 |
| 2 | 1234567 | 457 | 2 |
| 3 | 1234567 | 458 | 3 |
| 4 | 1234567 | 459 | 4 |
| 5 | 1234568 | 456 | 1 |
| 6 | 1234568 | 457 | 2 |
| 7 | 1234568 | 458 | 3 |
| 8 | 1234568 | 459 | 4 |
| 9 | 1234569 | 456 | 1 |
| 10 | 1234569 | 457 | 2 |
| 11 | 1234569 | 458 | 3 |
| 12 | 1234569 | 459 | 4 |

FIG. 6J

Unified Configuration
700a

```xml
<configuration name="MyConfiguration"
    xmlns="http://www.netcracker.com/schemas/mediation/transition"
    xmlns:v="http://www.netcracker.com/schemas/mediation/transition/validation"
    xmlns:tr="http://www.netcracker.com/schemas/mediation/transition/transformation"
    xmlns:rec="http://www.netcracker.com/schemas/mediation/transition/reconciliation">
    <entity-set name="SDB">
        <entity name="BSCBoard">
            <attribute name="FDN" />
            <attribute name="Serial_Number" />
        </entity>
        <entity name="BSCFrame">
            <attribute name="FDN" />
            <attribute name="Serial_Number" />
        </entity>
    </entity-set>
    <entity-set name="IDB Entity Set">
        <rec:target-inventory name="Test Inventory Project" />
        <entity name="Card" pk="Card ID">
            <rec:object-type nc-name="Card" id="116328" />
            <attribute name="Card ID" type="integer">
                <tr:expression transformation="Device Transformation">
                    <tr:source-attribute entity="BSCBoard" name="FDN" />
                </tr:expression>
                <rec:attr nc-name="CARD_ID" attr-id="1234567" />
            </attribute>
            <attribute name="Parent ID" type="integer" relation="Card to Device">
                <v:between majority="minor">
                    <v:min>0</v:min>
                    <v:max>1000000</v:max>
                </v:between>
                <v:is-not-null name="IsNotNull Validation Rule" majority="major" />
                <v:regexp-expression name="RegExp Validation Rule" majority="minor">
                    <v:expression>[[:digit:]]</v:expression>
                </v:regexp-expression>
                <tr:expression transformation="Device Transformation">
                    <tr:source-attribute entity="BSCFrame" name="FDN" />
                </tr:expression>
                <rec:attr nc-name="PARENT_ID" attr-id="1234568" />
            </attribute>
```

710a = first entity-set block (SDB)
720a = second entity-set block (IDB Entity Set)

FIG. 7A

Unified Configuration
700b

```
                    <attribute name="Name" type="string">
                        <tr:expression transformation="Device Transformation"
merge-rule="FDN-2 || FDN-1">
                            <tr:source-attribute entity="BSCFrame"
name="FDN" alias="FDN-2" />
                            <tr:source-attribute entity="BSCBoard" name="FDN"
alias="FDN-1" />
                        </tr:expression>
                        <rec:attr nc-name="NAME" attr-id="1234569" />
                    </attribute>
                    <tr:transformation name="Device Transformation">
                        <tr:source-entity name="BSCFrame" alias="FRAME" />
                        <tr:source-entity name="BSCBoard" alias="BOARD" />
                        <tr:join-condition name="By Serial Number">
720b <                           <tr:source-attribute>BOARD.Serial_Number</
tr:source-attribute>
                            <tr:source-attribute>FRAME.Serial_Number</
tr:source-attribute>
                        </tr:join-condition>
                        <tr:filter name="Filter with like" condition="like '%123%'">
                            <tr:source-attribute>BOARD.FDN</tr:source-
attribute>
                        </tr:filter>
                    </tr:transformation>
                </entity>
                <entity name="Device" pk="Device ID">
                    <attribute name="Device ID" type="integer" relation="Card to
Device" />
                </entity>
                <relationship name="Card to Device" multiplicity="0..1" direction="in">
                    <source-entity>Card</source-entity>
                    <destination-entity>Device</destination-entity>
                </relationship>
            </entity-set>
</configuration>
```

FIG. 7B

DECLARATIVE AND UNIFIED DATA TRANSITION

CROSS-REFERENCE TO RELATED PATENT APPLICATIONS

This application is a continuation of U.S. Pat. No. 11,308,072, entitled "DECLARATIVE AND UNIFIED DATA TRANSITION," filed on Jun. 17, 2016, which claims the benefit of and priority to U.S. application Ser. No. 13/508,081, entitled "DECLARATIVE AND UNIFIED DATA TRANSITION" filed on Nov. 9, 2009, which claims benefit of and priority to P.C.T National Phase of Application PCT/RU2009/000605 filed on Nov. 9, 2009.

FIELD OF THE INVENTION

The present invention relates generally to computer-based methods and apparatuses, including computer program products, for declarative and unified data transition.

BACKGROUND

Data transition, such as in system integration or ETL (extract, transform, and load) processes, is generally described as a list of steps of a whole process, i.e. in an imperative process. In implementing this list of steps, a knowledge domain is spread among all steps of the process. For example, in an extract step, where to put the data is described, in a validation step, what to check is described, and in a reconciliation step, what to transform is described. In other words, the same knowledge domain is partially described in every step of the data transformation. This repeating of knowledge definition(s) increases modeling time for the system, decreases reusability, and causes errors in knowledge consistency and integrity.

Thus, a need exists in the art for improved declarative and unified data transformation.

SUMMARY OF THE INVENTION

One approach to declarative and unified data transition is a computer implemented method. The method includes determining an unified configuration for a knowledge domain, the unified configuration including one or more predicates for one or more system objects, one or more relationships between the one or more system objects, or any combination thereof; generating one or more transformation rules based on the one or more predicates; transforming input data based on the one or more transformation rules, the input data including information associated with the one or more system objects, the one or more relationships between the one or more system objects, or any combination thereof; generating one or more reconciliation rules based on the one or more predicates, the one or more reconciliation rules associated with a destination database; and reconciling the transformed data with the destination database based on the one or more reconciliation rules.

Another approach to declarative and unified data transition is a computer implemented method. The method includes determining an unified configuration for a knowledge domain, the unified configuration including one or more predicates for one or more system objects, one or more relationships between the one or more system objects, or any combination thereof; generating one or more transformation rules based on the one or more predicates, the one or more transformations enabling transformation of input data, the input data including information associated with the one or more system objects, the one or more relationships between the one or more system objects, or any combination thereof; and generating one or more reconciliation rules based on the one or more predicates, the one or more reconciliation rules associated with a destination database and enabling reconciliation of the transformed data with the destination database.

Another approach to declarative and unified data transition is a computer program product. The computer program product is tangibly embodied in an information carrier. The computer program product includes instructions being operable to cause a data processing apparatus to perform any one of the steps described herein.

Another approach to declarative and unified data transition is a system. The system includes an unified configuration module configured to determine an unified configuration for knowledge domain, the unified configuration including one or more predicates for one or more system objects, one or more relationships between the one or more system objects, or any combination thereof; a transformation rules engine configured to generate one or more transformation rules based on the one or more predicates; a transformation module configured to transform input data based on the one or more transformation rules, the input data including information associated with the one or more system objects, the one or more relationships between the one or more system objects, or any combination thereof; a reconciliation rules engine configured to generate one or more reconciliation rules based on the one or more predicates, the one or more reconciliation rules associated with a destination database; and a reconciliation module configured to reconcile the transformed data with the destination database based on the one or more reconciliation rules.

Another approach to declarative and unified data transition is a system. The system includes an unified configuration module configured to determine an unified configuration for a knowledge domain, the unified configuration including one or more predicates for one or more system objects, one or more relationships between the one or more system objects, or any combination thereof; a transformation rules engine configured to generate one or more transformation rules based on the one or more predicates, the one or more transformations enabling transformation of input data, the input data including information associated with the one or more system objects, the one or more relationships between the one or more system objects, or any combination thereof; and a reconciliation rules engine configured to generate one or more reconciliation rules based on the one or more predicates, the one or more reconciliation rules associated with a destination database and enabling reconciliation of the transformed data with the destination database.

Another approach to declarative and unified data transition is a system. The system includes means for determining an unified configuration for a knowledge domain, the unified configuration including one or more predicates for one or more system objects, one or more relationships between the one or more system objects, or any combination thereof; means for generating one or more transformation rules based on the one or more predicates; means for transforming input data based on the one or more transformation rules, the input data including information associated with the one or more system objects, the one or more relationships between the one or more system objects, or any combination thereof; means for generating one or more reconciliation rules based on the one or more predicates, the one or more reconciliation rules associated with a destination database; and means for reconciling the transformed data with the destination database based on the one or more reconciliation rules.

Another approach to declarative and unified data transition is a system. The system includes means for determining an unified configuration for a knowledge domain, the unified configuration including one or more predicates for one or more system objects, one or more relationships between the one or more system objects, or any combination thereof; means for generating one or more transformation rules based on the one or more predicates, the one or more transformations enabling transformation of input data, the input data including information associated with the one or more system objects, the one or more relationships between the one or more system objects, or any combination thereof; and means for generating one or more reconciliation rules based on the one or more predicates, the one or more reconciliation rules associated with a destination database and enabling reconciliation of the transformed data with the destination database.

In other examples, any of the approaches above can include one or more of the following features.

In some examples, the method further includes transforming second input data based on the one or more transformation rules, the second input data including information associated with the one or more system objects, the one or more relationships between the one or more system objects, or any combination thereof; and reconciling the second transformed data with the destination database based on the one or more reconciliation rules.

In other examples, the method further includes generating one or more validation rules based on the one or more predicates; and validating the input data based on the one or more validation rules.

In some examples, the method further includes automatically modifying the input data based on the validation of the input data to remove at least one validation error associated with the input data.

In other examples, the method further includes extracting the input data from one or more source databases based on one or more extraction rules.

In some examples, the method further includes generating the one or more extraction rules based on the one or more predicates.

In other examples, the extracting the input data from the one or more source databases and the reconciling the transformed data with the destination database occur relative to each other in real-time or substantially in real-time.

In some examples, the method further includes generating one or more second reconciliation rules based on the one or more predicates, the one or more second reconciliation rules associated with a second destination database; and reconciling the transformed data with the second destination database based on the one or more second reconciliation rules.

In other examples, the transforming the input data further including joining at least one part of the input data with at least one other part of the input data based on the one or more transformation rules.

In some examples, the transforming the input data further including merging at least one part of the input data with at least one other part of the input data based on the one or more transformation rules.

In other examples, the method further includes generating one or more post-transformation validation rules based on the one or more predicates; and validating the transformed data based on the one or more post-transformation validation rules.

In some examples, the method further includes merging the reconciled data with data stored on the destination database.

In other examples, the method further includes appending the reconciled data with data stored on the destination database.

In some examples, the input data including one or more table sets, one or more tables, one or more table fields, or any combination thereof.

In other examples, the destination database including an operational support system database, a healthcare system database, an information technology database, or any combination thereof.

In some examples, the method further includes generating one or more second transformation rules based on the one or more predicates; transforming second input data based on the one or more second transformation rules, the second input data including information associated with the one or more system objects, the one or more relationships between the one or more system objects, or any combination thereof; generating one or more combined transformation rules based on the one or more predicates; and transforming the first and second transformed input data based on the one or more combined transformation rules, the first and second transformed input data including information associated with the one or more system objects, the one or more relationships between the one or more system objects, or any combination thereof.

In other examples, the method further includes generating one or more combined reconciliation rules based on the one or more predicates, the one or more combined reconciliation rules associated with one or more destination databases; and reconciling the first and second combined transformed input data with the one or more destination database based on the one or more combined reconciliation rules.

In some examples, the system further includes the transformation module further configured to transform second input data based on the one or more transformation rules, the second input data including information associated with the one or more system objects, the one or more relationships between the one or more system objects, or any combination thereof; and the reconciliation module further configured to reconcile the second transformed data with the destination database based on the one or more reconciliation rules.

In other examples, the system further includes a validation rules engine configured to generate one or more validation rules based on the one or more predicates; and a validation module-configured to validate the input data based on the one or more validation rules.

In some examples, the system further includes the validation module further configured to automatically modify the input data based on the validation of the input data to remove at least one validation error associated with the input data.

In other examples, the system further includes a source extraction module configured to extract the input data from one or more source databases based on one or more extraction rules.

In some examples, the system further includes a source extraction rule engine configured to generate the one or more extraction rules based on the one or more predicates.

In other examples, the system further includes the reconciliation rules engine further configured to generate one or more second reconciliation rules based on the one or more predicates, the one or more second reconciliation rules associated with a second destination database; and the reconciliation module further configured to reconcile the transformed data with the second destination database based on the one or more second reconciliation rules.

In some examples, the system further includes the transformation module further configured to join at least one part of the input data with at least one other part of the input data based on the one or more transformation rules.

In other examples, the system further includes the transformation module further configured to merge at least one part of the input data with at least one other part of the input data based on the one or more transformation rules.

In some examples, the system further includes the transformation module further configured to modify at least one part of the input data based on the one or more transformation rules.

In other examples, the system further includes a validation rules engine configured to generate one or more post-transformation validation rules based on the one or more predicates; and a validation module configured to validate the transformed data based on the one or more post-transformation validation rules.

In some examples, the system further includes the reconciliation module further configured to merge the reconciled data with data stored on the destination database.

In other examples, the system further includes the reconciliation module further configured to append the reconciled data with data stored on the destination database.

In some examples, the system further includes the transformation rules engine further configured to generate one or more second transformation rules based on the one or more predicates; the transformation module further configured to transform second input data based on the one or more second transformation rules, the second input data including information associated with the one or more system objects, the one or more relationships between the one or more system objects, or any combination thereof; the transformation rules engine further configured to generate one or more combined transformation rules based on the one or more predicates; and the transformation module further configured to transform the first and second transformed input data based on the one or more combined transformation rules, the first and second transformed input data including information associated with the one or more system objects, the one or more relationships between the one or more system objects, or any combination thereof.

In other examples, the system further includes the reconciliation rules engine further configured to generate one or more combined reconciliation rules based on the one or more predicates, the one or more combined reconciliation rules associated with one or more destination databases; and the reconciliation module further configured to reconcile the first and second combined transformed input data with the one or more destination database based on the one or more combined reconciliation rules.

The declarative and unified data transformation techniques described herein can provide one or more of the following advantages. An advantage to the declarative and unified data transition is that the technology enables the configuration and documentation of various types of data transitions without additional coding, thereby increasing the efficiency of data transformation by enabling additional new knowledge domains without requiring changes to the already configured parts. Another advantage is that the technology is reusable across various data transitions with limited reconfiguration because of the unified configuration, thereby providing cost-effective integration solutions, such as data migration and system integration in various context, like inventory reconciliation, legacy system migration, or integration.

Another advantage is that after the unified configuration is configured for a data transition project, the system can generate project documentation (e.g., design specification, low-level requirements, etc.) based on the unified configuration, thereby saving costs compared to the traditional development method, where users draft all design specification, and then accordingly configure the steps of the data transition project.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

FIG. 6A is exemplary input data;

FIG. 6B is an exemplary data definition of a unified configuration;

FIG. 6C is exemplary validation rules;

FIG. 6D is exemplary validated data;

FIG. 6E is exemplary transformation rules;

FIG. 6F is exemplary transformed data;

FIG. 6I is exemplary reconciliation rules;

FIG. 6J is exemplary reconciled data;

FIGS. 7A and 7B illustrate an exemplary unified configuration;

DETAILED DESCRIPTION

Figure 1:
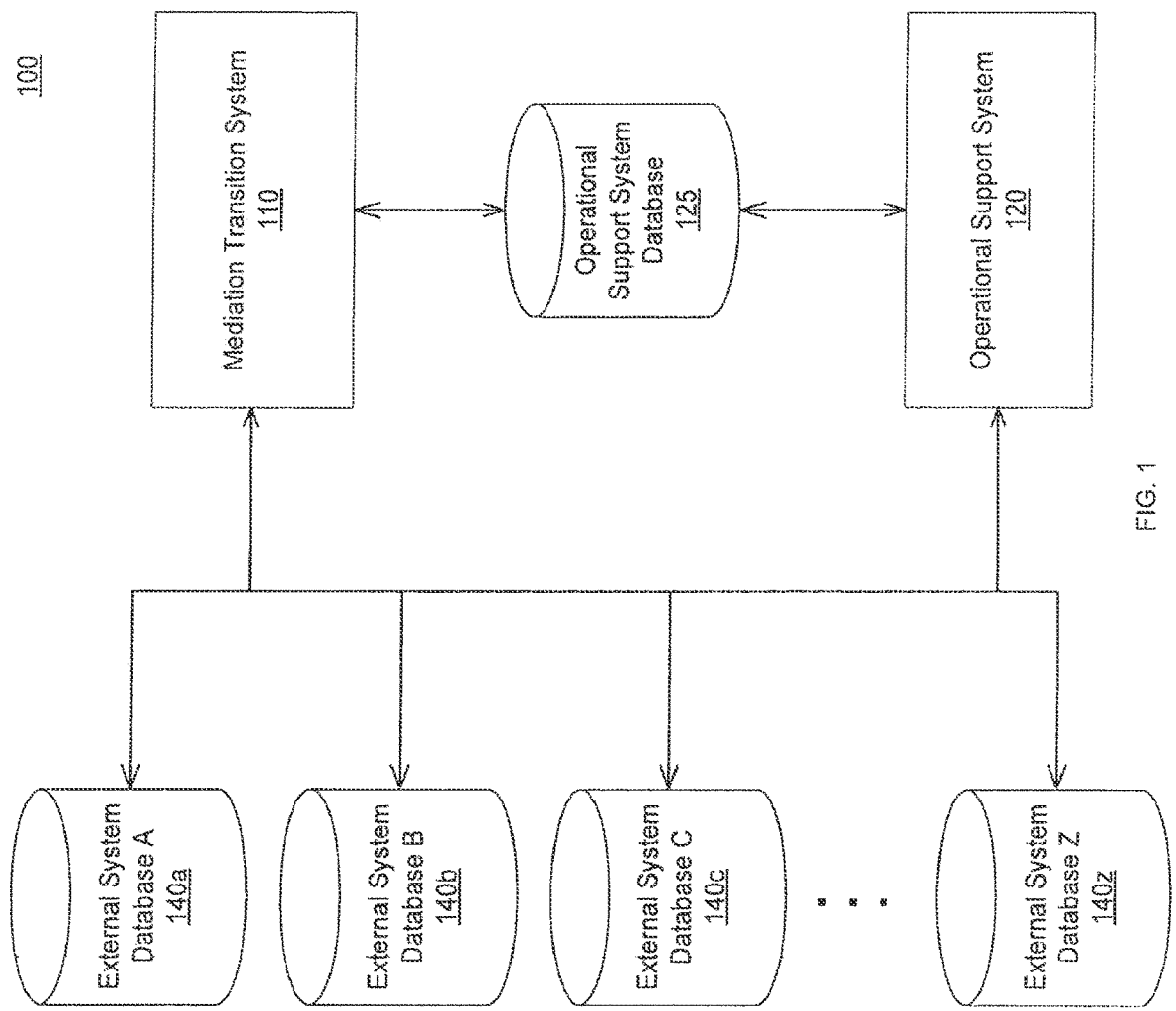
FIG. 1 is a diagram of an exemplary system for data transition between a plurality of databases and/or systems.

Declarative and unified data transition technology enables a description of a knowledge domain to be made once and utilized a plurality of times for the transition of data. The technology can manage the knowledge domain for the transition process by enabling the knowledge domain to be defined by users and/or administrators of the technology (e.g., add information, edit information, delete information, setup a template, etc.) and/or by generating the knowledge domain based on other processes and/or relationships. The knowledge domain can be declaratively described in an unified configuration. The unified configuration can include one or more predicates (e.g., <relationship name="Frame to Device" multiplicity="0..1" direction="in">, <relationship name="Card to Device" multiplicity="0..1" direction="in">, etc.) for one or more system objects (e.g., components of a system, devices of a system, cards of a system, entities of a system, parts of a system, etc.) and/or one or more relationships between the one or more system objects (e.g., card A is related to card B, cards A and B are part of device 1, etc.). The unified configuration of the knowledge domain can be, for example, organized in a multi-level hierarchy (e.g., a set of objects, a single object, a set of object attributes, single attributes, etc.).

The technology can centrally manage the knowledge domain for all of the components in the transition process. The components can include a validation step (e.g., check data against a set of validation rules, verify that data matches a particular criteria, etc.), a transformation step (e.g., convert information from a first database structure to a second database structure, convert data into an intermediate database format, etc.), and a reconciliation step (e.g., merge data to an existing destination database, merge data to a plurality of existing destination databases, overwrite data to an existing destination database, ignore data during the reconciliation to an existing destination database, append data to an existing destination database, etc.). In some examples, the components include a data extraction process and/or one or more validation steps (e.g., post-transformation validation step, post-reconciliation validation step, etc.). The transition process can occur in real-time or near real-time to enable the efficient transition of the data (i.e., the validation step, the transformation step, and the reconciliation step occur in real-time or near real-time).

The technology can include the unified configuration for the knowledge domain that includes the one or more predicates and/or the centralized knowledge base. The one or more predicates can be described utilizing metadata to describe a business domain (e.g., operational support system, information technology system, healthcare system, customer service system, enterprise resource planning system, accounting system, etc.) and/or can include predicates about all involved objects (e.g., entities, components, parts, etc.) and their relationships. The centralized knowledge base can be utilized by the steps of the integration process, including the validation step, the transformation step, and/or the reconciliation step. Another advantage to the data transformation process is that the one or more predicates and/or the centralized knowledge base enable the technology to be configurable, scalable, and applicable to broad business cases (e.g., integration of two or more systems, mirroring of data between two or more systems, etc.).

FIG. 1 is a diagram of an exemplary system 100. The system 100 includes a mediation transition system 110, an operational support system database 125, an operational support system 120, and a plurality of external system databases A 140a, B 140b, C 140c through Z 140z (generally referred to as 140). The mediation transition system 110, the operational support system database 125, the operational support system 120, and/or the plurality of external system databases 140 can communicate via one or more connections (e.g., a direct network connection, an indirect network connection, an external storage connection, etc.). The mediation transition system 110 can extract data from one or more of the plurality of external system databases 140, validate the extracted data, transform the validated data, and/or reconcile the validated transformed data with data stored on the operational support system database 125. The mediation transition system 110 can extract, validate, transform, and/or reconcile the data based on a unified configuration of a knowledge domain (e.g., operational support system knowledge domain, information technology system knowledge domain, etc.).

Although FIG. 1 illustrates the operational support system database 125 and the operational support system 120, the system 100 can be utilized for any type of application system (e.g., information technology system, telephone system, network management system, healthcare system, etc.).

Figure 2:
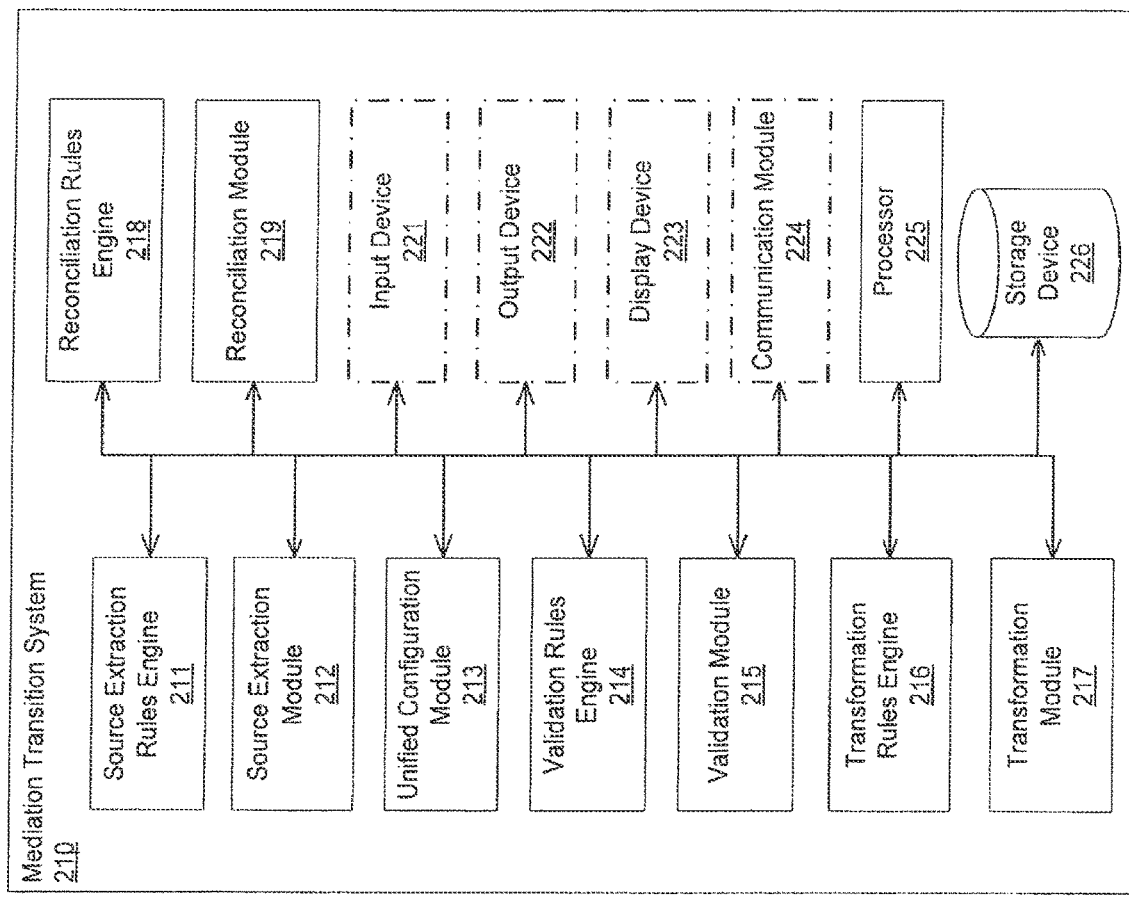
FIG. 2 is a diagram of an exemplary mediation transition system.

FIG. 2 is a diagram of an exemplary mediation transition system 210. The mediation transition system 210 includes a source extraction rule engine 211, a source extraction module 212, a unified configuration module 213, a validation rules engine 214, a validation module 215, a transformation rules engine 216, a transformation module 217, a reconciliation rules engine 218, a reconciliation module 219, an input device 221, an output device 222, a display device 223, a communication module 224, a processor 225, and a storage device. The modules and devices described herein can, for example, utilize the processor 225 to execute computer executable instructions and/or include a processor to execute computer executable instructions (e.g., an encryption processing unit, a field programmable gate array processing unit, etc.). It should be understood that the mediation transition system 210 can include, for example, other modules, devices, and/or processors known in the art and/or varieties of the illustrated modules, devices, and/or processors.

The source extraction rule engine 211 generates one or more extraction rules based on the one or more predicates. The source extraction rule engine 211 can generate (e.g., determine, modify, create, define, etc.) the one or more extraction rules based on the one or more predicates, the unified configuration, and/or other stored information (e.g., data from another unified configuration, data from another knowledge domain, etc.). The one or more extraction rules can include information that identifies tables, columns, rows, lines, identifiers, and/or roles where the input data is stored (e.g., user identification data is stored in the User_ID table, user names are stored in the User_Name column, etc.)

The source extraction module 212 extracts input data (also referred to as source database (SDB)) from one or more source databases (e.g., plain text file, organized data, file of data, marked-up data, commercially available database system, enterprise database, relational database, non-relational database, XML-based database, read-only database, non-standard meta-model driven database, etc.) based on one or more extraction rules (e.g., SELECT*from User ID; SELECT*from User_Name WHERE ID=O; etc.).

The unified configuration module 213 determines an unified configuration for knowledge domain. The unified configuration includes one or more predicates for one or more system objects (e.g., doctor identification includes licensed states, patient identification includes mailing address, etc.) and/or one or more relationships between the one or more system objects (e.g., patient identification includes primary healthcare provider identification, doctor identification includes hospital identification, etc.).

The validation rules engine 214 generates one or more validation rules based on the one or more predicates and/or generates one or more post-transformation validation rules based on the one or more predicates. The validation rule engine 214 can generate (e.g., determine, modify, create, define, etc.) the one or more validation rules based on the on the one or more predicates, the unified configuration, and/or other stored information (e.g., data from another unified configuration, data from another knowledge domain, transformation rules, reconciliation rules, operational support system model, destination system model, database constraints, customized validations, etc.). For example, the validation rule engine 214 determines one or more validation rules based on the reconciliation rules associated with a destination database (e.g., specified syntax, specified data structure, etc.). The one or more validation rules can include number checks (e.g., integer check, minimum number, maximum number, etc.), null checks, key multiplicity, primary key validation, row-level validation, length validation, and/or any other type of input validation (e.g., number, character, word, sentence, logical expression, etc.).

The validation module 215 validates the input data based on the one or more validation rules (e.g., is the data an integer, is the data above the number ten, etc.) and/or validates the transformed data based on the one or more post-transformation validation rules. The validation module 215 can automatically modify the input data based on the validation of the input data to remove at least one validation error associated with the input data (e.g., convert a written number to a numerically number, convert a real number to an integer, determine input for NULL data, delete the row/column/data, etc.). In other examples, the validation module 215 can report any validation errors.

The transformation rules engine 216 generates one or more transformation rules based on the one or more predicates. The transformation rule engine 216 can generate (e.g., determine, modify, create, define, etc.) the one or more transformation rules based on the on the one or more predicates, the unified configuration, and/or other stored information (e.g., data from another unified configuration, data from another knowledge domain, validation rules, reconciliation rules, operational support system model, destination system model, database constraints, customized transformations, etc.). The one or more transformations can enable the transformation of input data into transformed data (also referred to as intermediate database (IDB)). The input data can include information associated with the one or more system objects and/or the one or more relationships between the one or more system objects.

The transformation module 217 transforms input data based on the one or more transformation rules, transform second input data based on the one or more transformation rules, and/or transform any number of input data based on the one or more transformation rules. The second input data including information associated with the one or more system objects and/or the one or more relationships between the one or more system objects. The transformation module 217 can join at least one part of the input data with at least one other part of the input data based on the one or more transformation rules (e.g., join User table with Patient table, join User column with Doctor column, etc.). The transformation module 217 can merge at least one part of the input data with at least one other part of the input data based on the one or more transformation rules (e.g., merge User table with Patient table for all active Users, merge Doctor column with Hospital column for all Doctors grossing over $1 million per year, etc.). The transformation module 217 can modify at least one part of the input data based on the one or more transformation rules (e.g., delete a part of the input data, convert numbers, etc.).

The reconciliation rules engine 218 generates one or more reconciliation rules based on the one or more predicates. The one or more reconciliation rules can be associated with a destination database (e.g., plain text file, organized data, file of data, marked-up data, commercially available database system, enterprise database, relational database, non-relational database, XML-based database, write-once database, non-standard meta-model driven database, etc.). The reconciliation rules engine 218 can generate one or more second reconciliation rules based on the one or more predicates. The one or more second reconciliation rules can be associated with a second destination database. The one or more reconciliation rules and/or the one or more second reconciliation rules can enable reconciliation of the transformed data with the destination database.

The reconciliation module 219 reconciles the transformed data with the destination database based on the one or more reconciliation rules and/or reconciles the second transformed data with the destination database based on the one or more reconciliation rules. The reconciliation module 219 can reconcile the transformed data with the second destination database based on the one or more second reconciliation rules. The reconciliation module 219 can merge the reconciled data with data stored on the destination database (e.g., combine parts of the reconciled data with parts of the data stored on the destination database, transformation rules, validation rules, operational support system model, destination system model, database constraints, customized validations, etc.). The reconciliation module 219 can append the reconciled data with data stored on the destination database (e.g., add the parts of the reconciled data to the end of the data stored on the destination database, etc.).

The input device 221 receives information associated with the mediation transition system 210 (e.g., instructions from a user, instructions from another computing device, etc.) from a user (not shown) and/or another computing system (not shown). The input device 221 can include, for example, a keyboard, a scanner, etc. The output device 222 outputs information associated with the mediation transition system 210 (e.g., information to a printer (not shown), information to a speaker, etc.).

The display device 223 displays information associated with the mediation transition system 210 (e.g., status information, input data, transformed data, validated data, reconciled data, etc.). The communication module 224 receives the input data and/or transmits the reconciled data. The processor 225 executes the operating system and/or any other computer executable instructions for the mediation transition system 210 (e.g., executes applications, transforms data, reconciles data, security functions, etc.).

The storage device 226 stores input data, validated data, transformed data, reconciled data, instructions, and/or any other data associated with the mediation transition system 210. The storage device 226 can include a plurality of storage devices and/or the mediation transition system 210 can include a plurality of storage devices (e.g., an input data storage device, a transformed data storage device, etc.). The storage device 226 can include, for example, long-term storage (e.g., a hard drive, a tape storage device, flash memory, etc.), short-term storage (e.g., a random access memory, a graphics memory, etc.), and/or any other type of computer readable storage.

Figure 3:
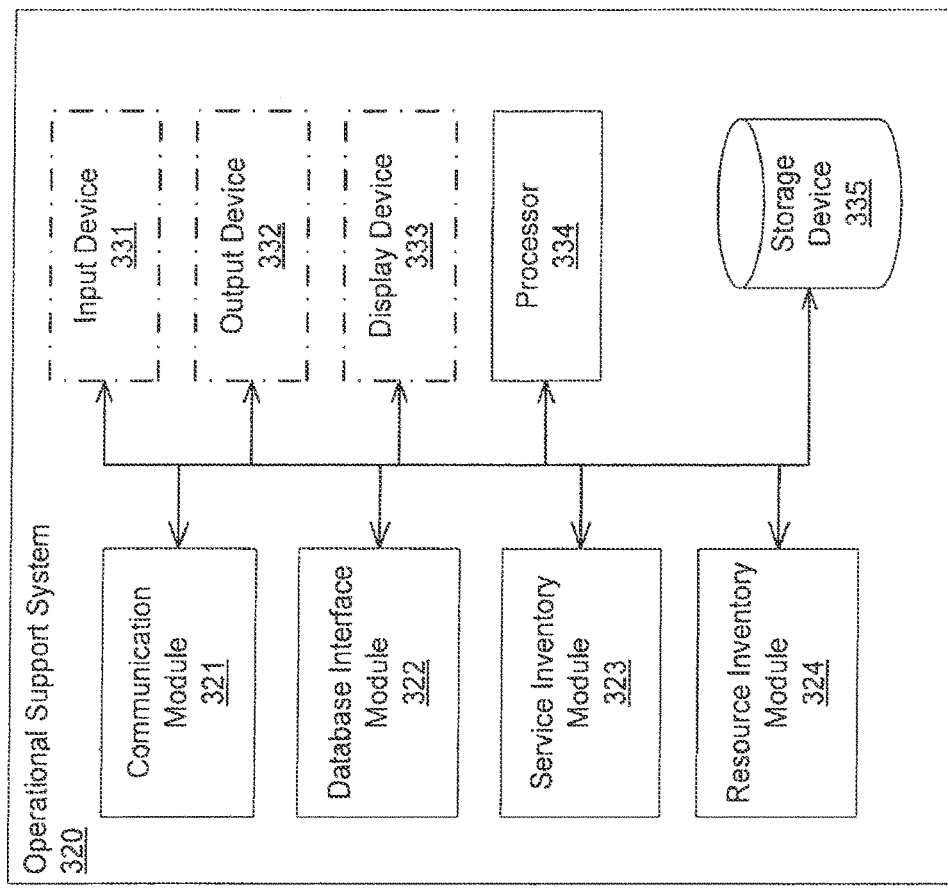
FIG. 3 is a diagram of an exemplary telecom operational support system.

FIG. 3 is a diagram of an exemplary telecom operational support system 320. The telecom operational support system 329 can be, for example, the source or destination systems involved in data transition. The operational support system 320 includes a communication module 321, a database interface module 322, a service inventory module 323, a resource inventor module 324, an input device 331, an output device 332, a display device 333, a processor 334, and/or a storage device 335. The modules and devices described herein can, for example, utilize the processor 334 to execute computer executable instructions and/or include a processor to execute computer executable instructions (e.g., an encryption processing unit, a field programmable gate array processing unit, etc.). It should be understood that the operational support system 320 can include, for example, other modules, devices, and/or processors known in the art and/or varieties of the illustrated modules, devices, and/or processors.

The communication module 224 receives the reconciled data and/or transmits the output data (e.g., data utilized as input data by the mediation transition system, etc.). The database interface module 322 communicates with the storage device 335, an operational support system database, and/or one or more other external databases. The service inventory module 323 manages the service inventory for the operational support system 320 (e.g., receives updates to the service inventory, transmits updates to the service inventory, etc.). The resource inventory module 324 manages the resource inventory for the operational support system 320 (e.g., receives updates to the resource inventory, transmits updates to the resource inventory, etc.).

The input device 331 receives information associated with the operational support system 320 (e.g., instructions from a user, instructions from another computing device, etc.) from a user (not shown) and/or another computing system (not shown). The input device 331 can include, for example, a keyboard, a scanner, etc. The output device 332 outputs information associated with the operational support system 320 (e.g., information to a printer (not shown), information to a speaker, etc.).

The display device 333 displays information associated with the operational support system 320 (e.g., status information, output data, reconciled data, etc.). The processor 334 executes the operating system and/or any other computer executable instructions for the operational support system 320 (e.g., executes applications, transforms data, manages data, security functions, etc.).

The storage device 335 stores data, reconciled data, instructions, and/or any other data associated with the operational support system 320. The storage device 335 can include a plurality of storage devices and/or the operational support system 320 can include a plurality of storage devices (e.g., an input data storage device, a transformed data storage device, etc.). The storage device 335 can include, for example, long-term storage (e.g., a hard drive, a tape storage device, flash memory, etc.), short-term storage (e.g., a random access memory, a graphics memory, etc.), and/or any other type of computer readable storage.

Figure 4:
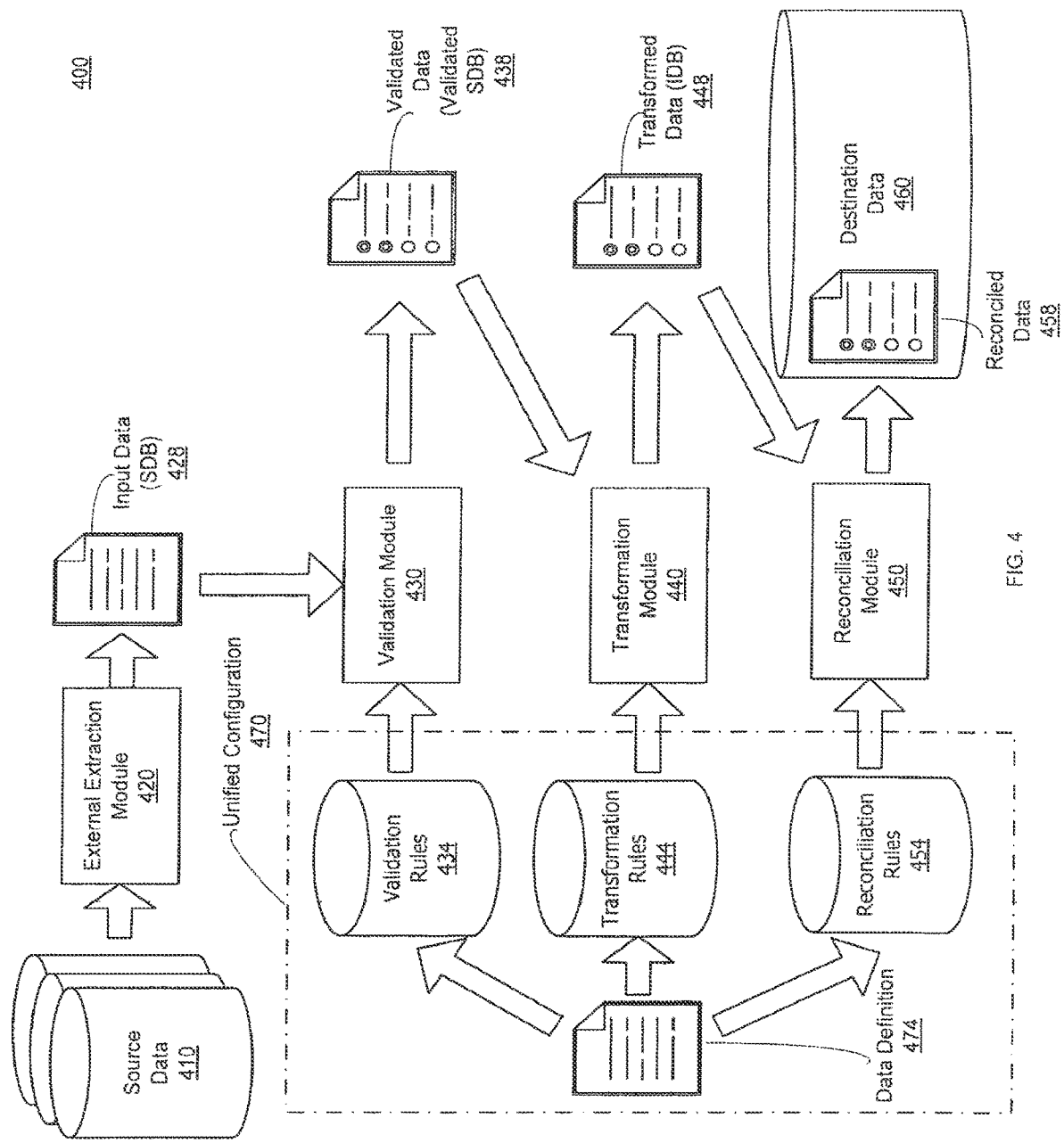
FIG. 4 is a flow diagram of an exemplary process for data transformation.

FIG. 4 is a flow diagram 400 of an exemplary process for data transition. An external extraction module 420 extracts input data 428 from source data 410 (e.g., from external storage such as a text file, from a database, from an external device and system utilizing a protocol such as simple network management protocol (SNMP) and/or a command line interface (CLI), etc). A unified configuration module (not shown) generates validation rules 434, transformation rules 444, and reconciliation rules 454 based on a data definition 474. The validation rules 434, the transformation rules 444, the reconciliation rules 454, and the data definition 474 are an unified configuration 470.

A validation module 430 validates the input data 428 to form validated data 438 based on the validation rules 434. A transformation module 440 transforms the validated data 438 to transformed data 448 based on the transformation rules 444. A reconciliation module 450 reconciles the transformed data 448 into a destination data 460 via reconciled data 458 based on the reconciliation rules 454.

In some examples, the unified configuration 470 describes system objects (e.g., entities, components, etc.) and their relationships. The unified configuration 470 can specify extra parameters for the system objects which add information in one or more knowledge domains. The knowledge domains can be stored in a configuration in an unified independent manner (e.g., for XML, each knowledge domain is in a different XML namespace). The knowledge domain can include one or more predicates that provide information regarding the behavior of different processes. For example, the predicates includes information about how to obtain data for an entity, information about how to check consistency, and information about how to load data into a destination database. Each process step can define how it interprets data in a specific knowledge domain. The unified configuration can include extra declarations and/or create special processes for the extra declarations. For example, the extra declarations include how to load data into database tables from simple network management protocol (SNMP) agents or lightweight directory access protocol (LDAP).

In other examples, the unified configuration 470 enables a user and/or an administrator to describe once the domain knowledge of the transition, in one place, and then map it to source database, to the destination database, and/or rules for checking consistency of the data. The technology described herein can be utilized for various types of integration and/or migration, such as mapping a data model to SNMP, mapping a read-only database to a legacy element management service (EMS), etc.

Figure 5A:
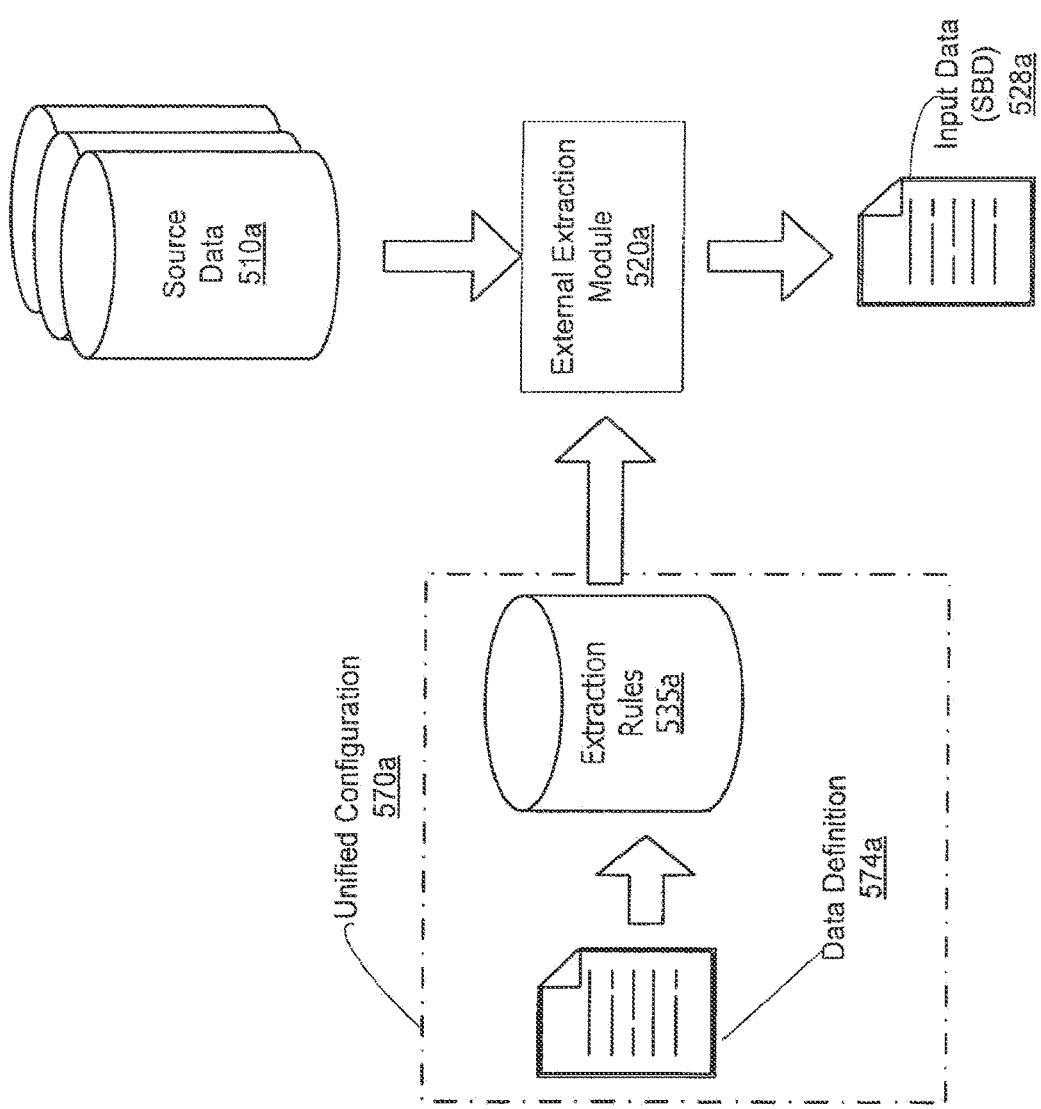
FIG. 5A is a flow diagram of an exemplary process for data extraction.

FIG. 5A is a flow diagram 500a of an exemplary process for data extraction. An external extraction module 520a extracts input data 528a from source data 510a based on extraction rules 535a. A source extraction rule engine (not shown) generates the extraction rules 535a based on a data definition 574a. The extraction rules 535a and the data definition 574a are generally described as an unified configuration 570a.

Figure 5B:
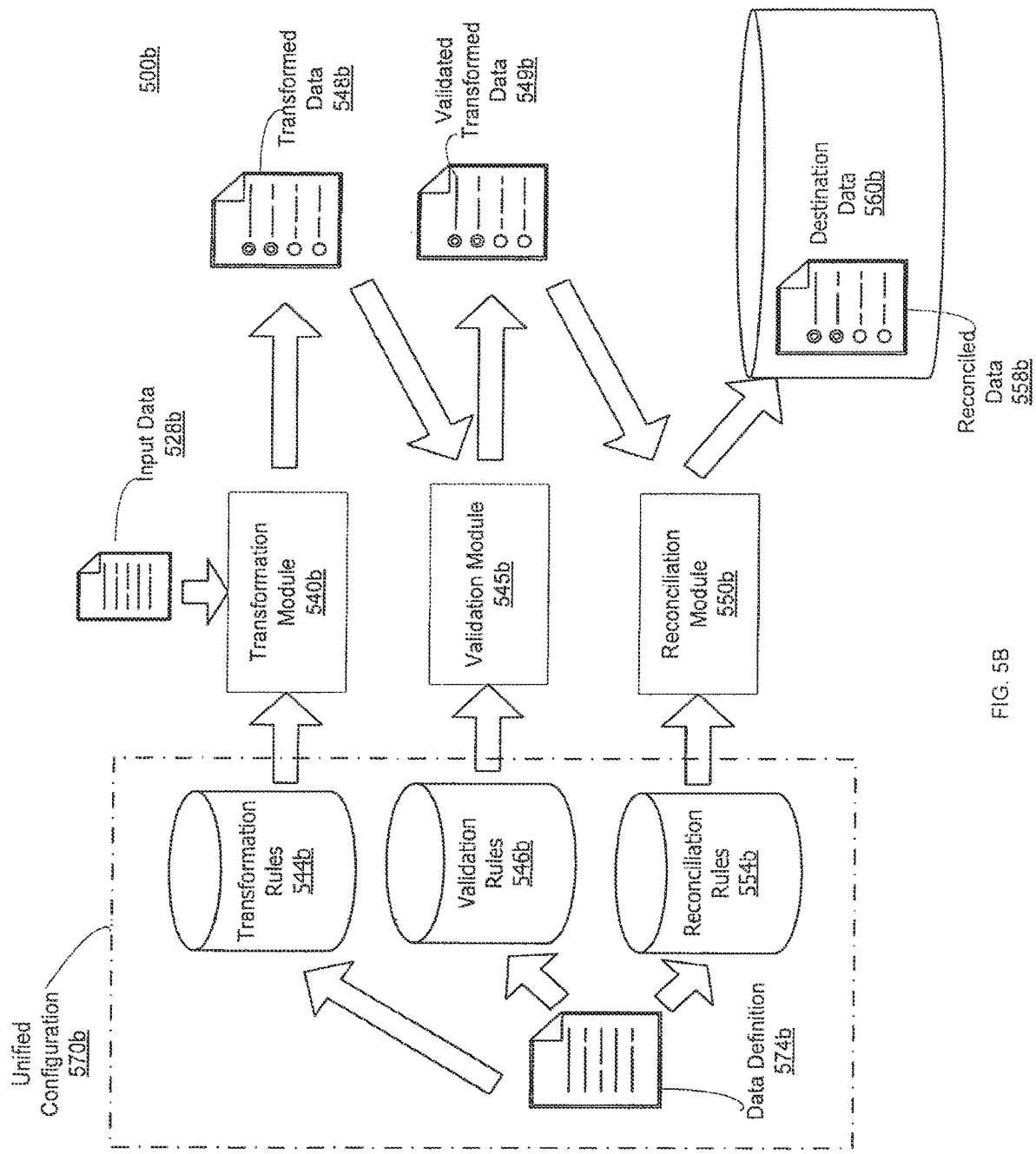
FIG. 5B is a flow diagram of another exemplary process for data transition.

FIG. 5B is a flow diagram of another exemplary process for data extraction. A validation rule engine, transformation rule engine, and a reconciliation rule engine (not shown) generate validation rules 546b, transformation rules 544b, and reconciliation rules 554b, respectively, based on a data definition 574b. The validation rules 546b, the transformation rules 544b, the reconciliation rules 554b, and the data definition 574b are parts of the unified configuration 570b.

A transformation module 540b transforms input data 528b to transformed data 548b based on the transformation rules 544b. A validation module 545b validates the transformed data 548b to form validated transformed data 549b based on the validation rules 546b. A reconciliation module 550b reconciles the validated transformed data 549b into a destination data 560b via reconciled data 558b based on the reconciliation rules 554b.

FIG. 6A is exemplary input data 600a. The input data 600a includes BSCBoard data 610a, BSCFrame data 620a, and BSCDevice data 630a. The input data 600a can be extracted from a source database (e.g., plain text file, a hierarchical database system, etc.) based on one or more extraction rules.

FIG. 6B is an exemplary unified configuration 600*b*. The unified configuration 600*b* a data definition part. The unified configuration 600*b* includes source database (SDB) configuration 610*b* and intermediate database (IDB) configuration 620*b*. The unified configuration 600*b* describes a knowledge domain (KD). The unified configuration 600*b* can include system objects (e.g., entities such as BSC Board and/or Card, etc.) associated with the KD, attributes of the system objects, relationships between system objects, and/or multiplicity of the relationships. The system object set (e.g., entity set) can be a container that provides capabilities to specify system object settings and references that utilized to prepare the validation, the transformation, and/or the reconciliation process. The system object can include one or more attributes (e.g., a primary key attribute which is a unique attribute which identifies the system object). Every attribute can be defined by the attribute type. Attributes from different system objects can be involved in relationships with uni-, in- and/or out-directions.

FIG. 6C is exemplary validation rules 600*c*. The validation rules 600*c* include the SDB configuration as illustrated above in the unified configuration 600*b* and three validation rules 610*c*, 620*c*, and 630*c*. The validation rules engine 214 of FIG. 2 can generate (e.g., determine, find, modify, etc.) the three validation rules 610*c*, 620*c*, and 630*c* based on the unified configuration 600*b* and/or other information associated with the knowledge domain (e.g., rules defined by an administrator, rules utilized in a previous validation of the same knowledge domain, rules defined in the knowledge domain, etc.).

In some examples, the validation rules can be defined on every level of the KD (e.g., attribute, entity, entity-set, etc.). The attribute-level validation rules 610*c*, 620*c*, and 630*c* check values of concrete attribute on a given entity. In some example, the "Between" rule checks whether the attribute value is in the range specified by the values of the "min" and "max" parameters. In other examples, the "Is Not Null" rule checks whether the attribute value is not null. In some examples, the "Regular Expression" rule checks the attribute value against the mask specified by the value of the "expression" parameter.

FIG. 6D is exemplary validated data 600*d*. The validation data 600*d* is the result of validation based on the validation rules 600*c*. The validated data 600*d* includes four deleted entries 610*d*, 620*d*, 630*d*, and 640*d*. The first deleted entry 610*d* is deleted based on the "IsNotNull 1 Validation Rule" 610*c*. The second deleted entry 620*d* is deleted based on the "IsNotNull 2 Validation Rule" 620*c*. The third deleted entry 630*d* and fourth deleted entry 640*d* are deleted based on the "Like Validation Rule" 630*c*.

FIG. 6E is exemplary transformation rules 600*e*. The transformation rules 600*e* include a plurality of transformation rules 610*e*, 620*e*, 630*e*, 640*e*, 650*e*, and 660*e*. The transformation rules engine 216 of FIG. 2 can generate the transformation rules 610*e*, 620*e*, 630*e*, 640*e*, 650*e*, and 660*e* based on the unified configuration 600*b* and/or other information associated with the knowledge domain (e.g., rules defined by an administrator, rules utilized in a previous transformation of the same knowledge domain, etc.). As illustrated, the transformation rule 630*e* merges BSCFrame Serial Number and the BSCCard Serial Number together to form the Name field for the Card entity.

In some examples, the transformation rules are defined on every level of the KD. The transformation rules engine 216 can define one "transformation" session from SDB to IDB and one transformation expression (rule) on the attribute "Name." Every transformation can be defined for source entities in the SDB. In other examples, destination expressions define mapping among source and destination attributes and/or can express destination attribute value using special merge-rule. In some examples, a join condition is the equal condition of two source entities for joining into result. In other examples, data from source entities can be filtered using special filter by attribute value.

FIG. 6F is exemplary transformed data 600*f*. The validated data 600*d* is transformed into the transformed data 600*f* based on the transformation rules 600*e*. The transformed data 600*f* includes card data 610*f* and device data 620*f*.

Figure 6G:
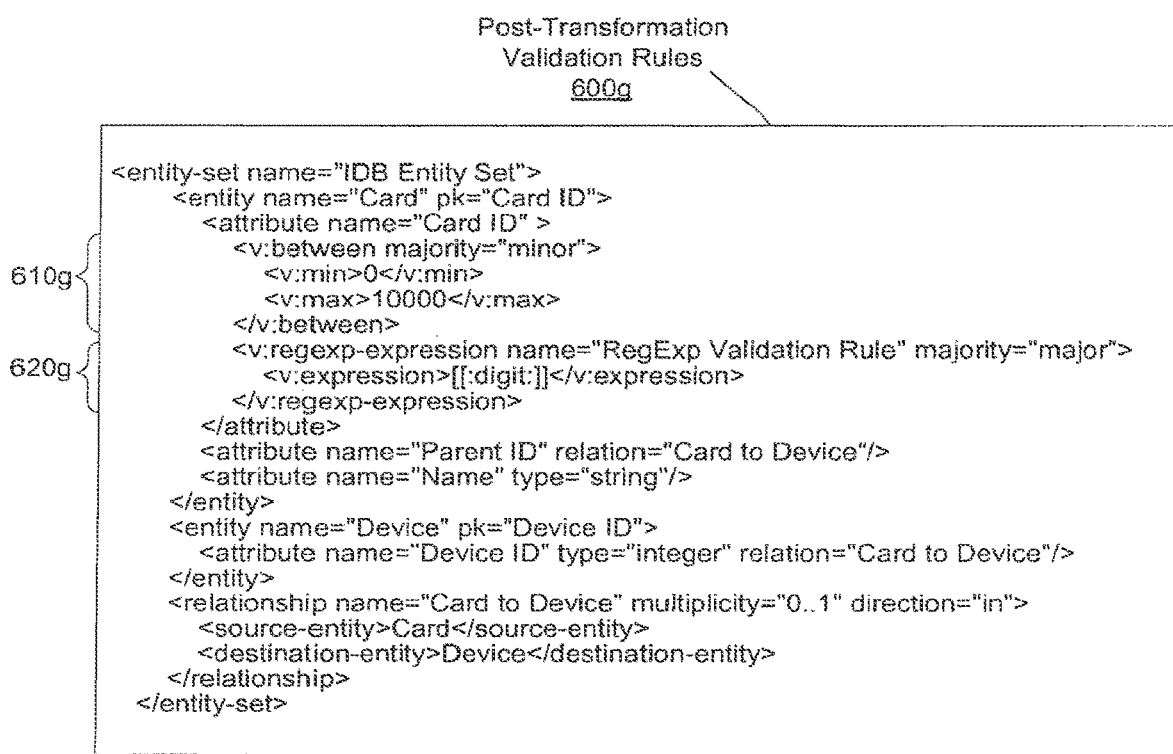
FIG. 6G is exemplary post-transformation validation rules.

FIG. 6G is exemplary post-transformation validation rules 600*g*. The post-transformation validation rules 600*g* include two validation rules 610*g* and 620*g*. The validation rules engine 214 of FIG. 2 can generate (e.g., determine, find, modify, etc.) the validation rules 610*g* and 620*g* based on the unified configuration 600*b* and/or other information associated with the knowledge domain (e.g., rules defined by an administrator, rules utilized in a previous validation of the same knowledge domain, etc.).

Figure 6H:
FIG. 6H is exemplary validated transformed data.

FIG. 6H is exemplary validated transformed data 600*h*. The transformed data 600*f* is validated into the validated transformed data 600*h* based on the post-transformation validation rules 600*g*. The validation module 215 of FIG. 2 deletes one entry 610*h*. The deleted entry 610*h* is deleted based on the "RegExp Validation Rule" 620*g*.

FIG. 6I is exemplary reconciliation rules 600*i*. The reconciliation rules 600*i* include a plurality of reconciliation rules 610*i*, 620*i*, 630*i*, 640*i*, 650*i*, and 660*i*. The reconciliation rules engine 218 of FIG. 2 can generate (e.g., determine, find, modify, etc.) the reconciliation rules 610*i*, 620*i*, 630*i*, 640*i*, 650*i*, and 660*i* based on the unified configuration 600*b* and/or other information associated with the knowledge domain (e.g., rules defined by an administrator, rules utilized in a previous reconciliation of the same knowledge domain, etc.).

In some examples, the reconciliation rules 600*i* can be defined on every level of the K.D. The reconciliation rules can include three reconciliation mapping rules. In other examples, every entity set is reconciled to an inventory project, every entity is mapped to a special object type, and/or every attribute is mapped to a special attribute.

FIG. 6J is exemplary reconciled data 600*j*. The validated transformed data 600*h* is reconciled into the reconciled data 600*j* based on the reconciliation rules 600*i*. The reconciled data 600*j* includes data reconciled from the validated transformed data 600*h* based on the reconciliation rules 600*i*. The reconciled data 600*j* can be appended to the destination database (e.g., a plain text file).

Although FIGS. 6A through 6J illustrate the data definition 600*b* of the unified configuration and rules utilizing extensible markup language (XML), the data definition 600*b* and/or one or more of the rules can utilize any type of protocol, language, and/or standard (e.g., plain text,), spreadsheet, relational or other database, JavaScript, Lisp, Haskell, etc.

FIGS. 7A and 7B illustrate an exemplary unified configuration 700*a* and 700*b*. The unified configuration 700*a* and 700*b* includes the DB section 710*a* and the SDB section 720*a* and 720*b*. As illustrated in FIGS. 7A and 7B, the unified configuration can be a single configuration file that is utilized by the modules and/or engines described herein.

Although FIGS. 7A and 7B illustrate the unified configuration 700*a* and 700*b* with a single IDB section 710*a* and a single SDB section 720*a*, the unified configuration 700*a* and 700*b* can include a plurality of IDB sections and/or a plurality of SDB sections. The technology can utilize part or all of the plurality of DB sections and/or the plurality of SDB sections.

In some examples, the IDB section 710*a* represents parameters of a particular entity (e.g., a circuit, a device, etc.). If the particular entity includes multiple values, the multiple values can be represented in a parameter table.

Figure 8A:
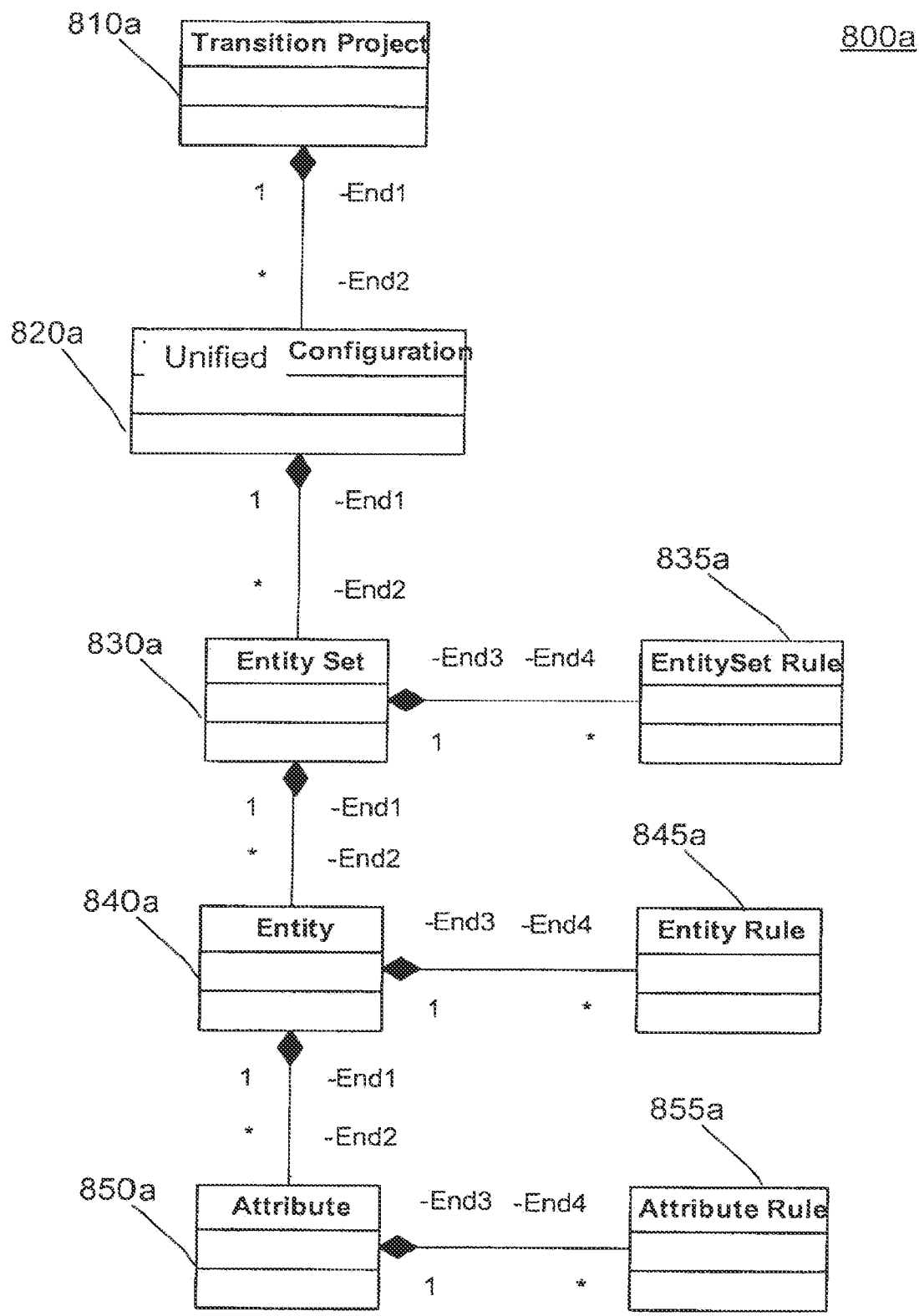
FIG. 8A illustrates an exemplary structure of rules in a unified configuration for a data transition project.

FIG. 8A illustrates an exemplary structure 800*a* of rules for data transition. The structure 800*a* includes a transition project 810*a*, a unified configuration 820*a*, an entity set 830*a*, an entity 840*a*, and an attribute 850*a*. The entity set level 830*a* includes entity set rules 835*a*. The entity level 840*a* includes entity rules 845*a*. The attribute level 850*a* includes attribute rules 855*a*. The rules and/or structure thereto can be utilized by the modules and/or engines described herein to generate extraction rules, validation rules, transformation rules, and/or reconciliation rules.

Figure 8B:
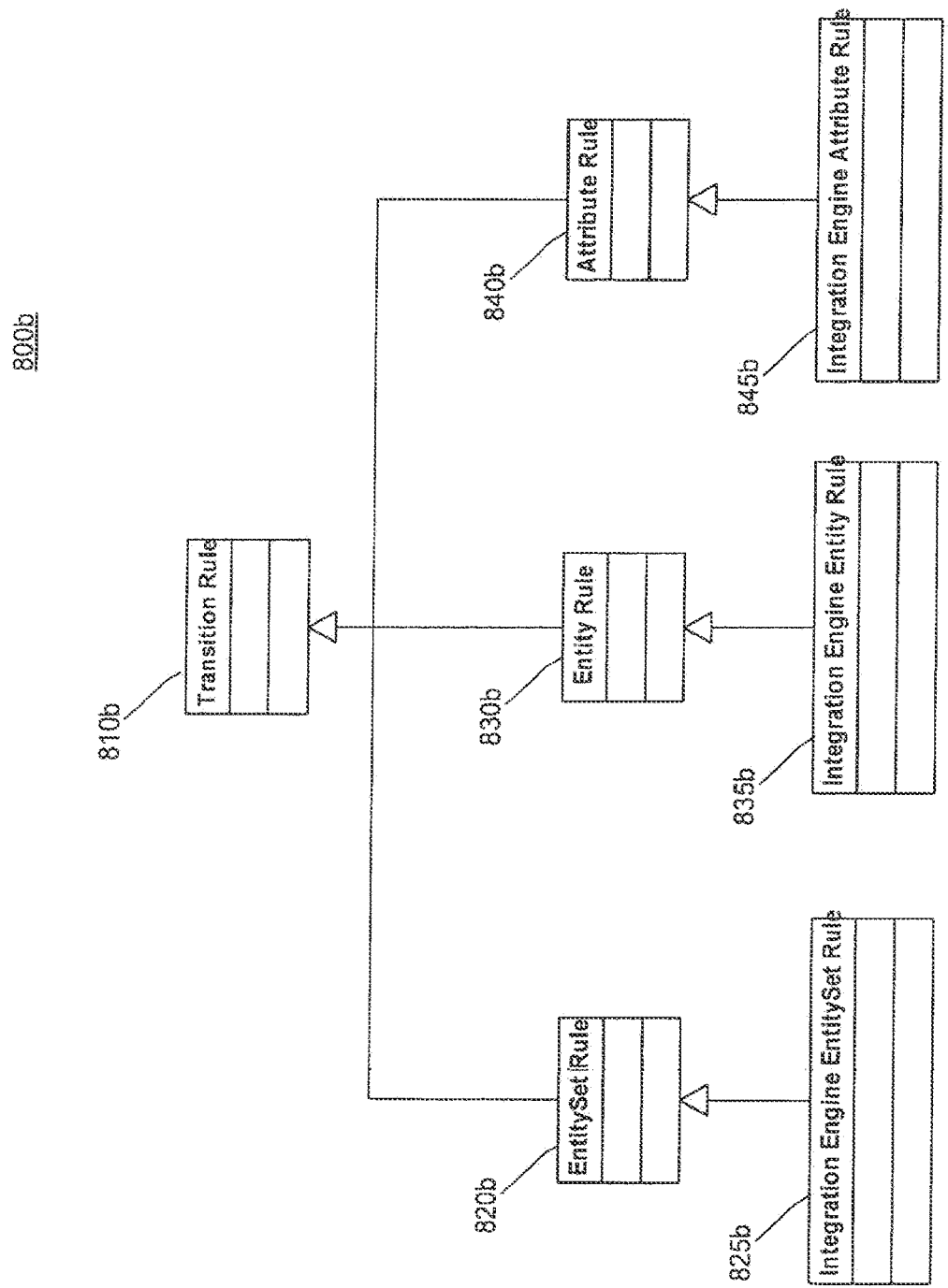
FIG. 8B illustrates an exemplary structure of hierarchy rules in a unified configuration for a data transition project.

FIG. 8B illustrates an exemplary structure 800*b* of hierarchy rules for data transition. The structure 800*b* includes a transition rule 810*b*. The transition rule 810*b* includes an entity set rule 820*b*, an entity rule 830*b*, and an attribute rule 840*b*. The entity set rule 820*b* includes an integration engine entity set rule 825*b*. The entity rule 830*b* includes an integration engine entity rule 835*b*. The attribute rule 840*b* includes an integration engine attribute rule 845*b*. The rules and/or structure thereto can be utilized by the modules and/or engines described herein to generate extraction rules, validation rules, transformation rules, reconciliation rules and/or any other rules.

Figure 9:
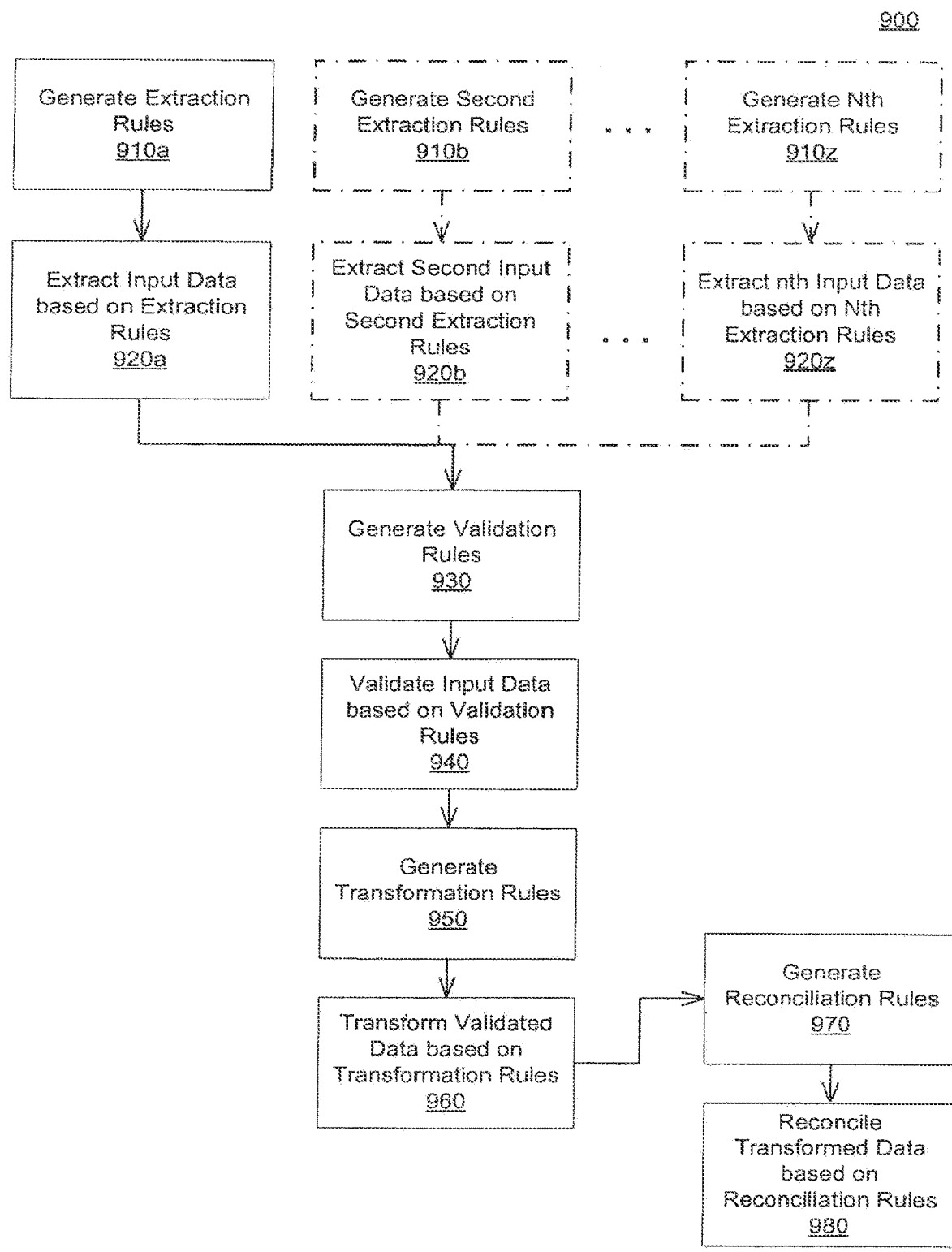
FIG. 9 is a flowchart of another exemplary process for data transition.

FIG. 9 is a flowchart 900 of another exemplary process for data transition utilizing, for example, the mediation transition system 210 of FIG. 2. The source extraction rule engine 211 generates (910*a*, 910*b* through 910*z*) the one or more first, second through Nth extraction rules based on the one or more predicates. The source extraction module 212 extracts (920*a*, 920*b* through 920*z*) the first, second through Nth input data from one or more source databases based on the first, second through Nth extraction rules, respectively.

The validation rules engine 214 generates (930) one or more validation rules based on the one or more predicates. The validation module 215 validates (940) the input data (in this example, the first, second through Nth input data) based on the one or more validation rules. The transformation rules engine 216 generates (950) one or more transformation rules based on the one or more predicates. The transformation module 217 transforms (960) input data based on the one or more transformation rules. The reconciliation rules engine 218 generates (970) one or more reconciliation rules based on the one or more predicates, and the one or more reconciliation rules associated with a destination database. The reconciliation module 219 reconciles (980) the transformed data with the destination database based on the one or more reconciliation rules.

Figure 10:
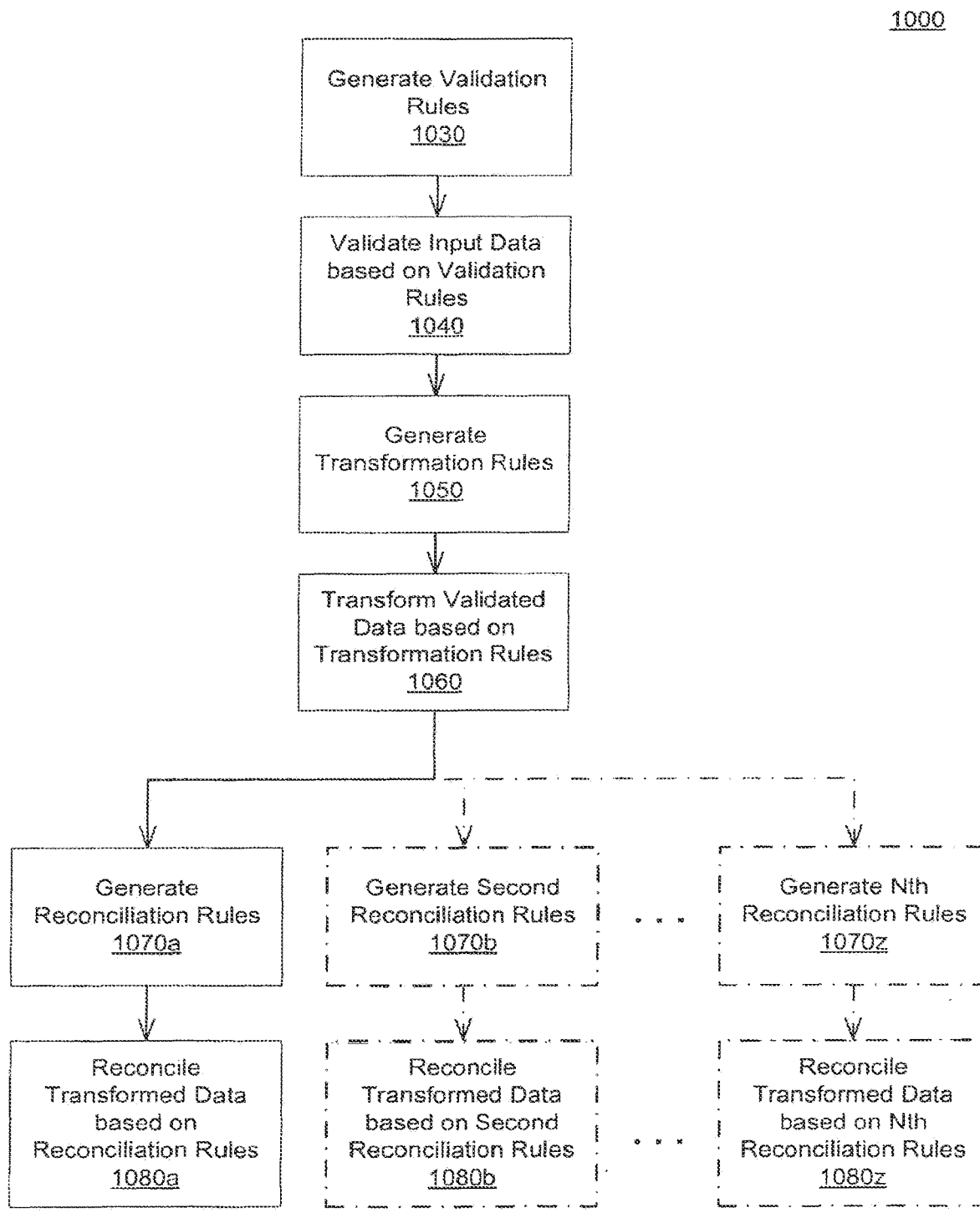
FIG. 10 is a flowchart of another exemplary process for data transition.

FIG. 10 is a flowchart 1000 of another exemplary process for data transition utilizing, for example, the mediation transition system 210 of FIG. 2. The validation rules engine 214 generates (1030) one or more validation rules based on the one or more predicates. The validation module 215 validates (1040) the input data based on the one or more validation rules. The transformation rules engine 216 generates (1050) one or more transformation rules based on the one or more predicates. The transformation module 217 transforms (1060) input data based on the one or more transformation rules. The reconciliation rules engine 218 generates (1070*a*, 1070*b* through 1070*z*) one or more first, second through Nth reconciliation rules based on the one or more predicates. Each of the one or more reconciliation rules are associated with a destination database (e.g., the one or more first reconciliation rules are associated with a first destination database, the one or more second reconciliation rules are associated with a second destination database, etc.). The reconciliation module 219 reconciles (1080*a*, 1080*b* through 1080*z*) the transformed data with the first, second through Nth destination databases based on the one or more first, second through Nth reconciliation rules, respectively.

Although FIG. 10 illustrates a flowchart 1000 of the reconciliation rules generation and execution as concurrent, the reconciliation rules generation and/or execution can occur in any order. For example, the reconciliation rules generation and/or execution are defined based on the destination databases. In other examples, the reconciliation rules are generated concurrently and the execution is not concurrent (e.g., in branches, at different times, etc.). In some examples, the reconciliation rule generation can occur in a specified order, a runtime order, and/or based on prior reconciliation rule generations. In this example, the reconciliation execution can occur based on the reconciliation rule generation.

Figure 11:
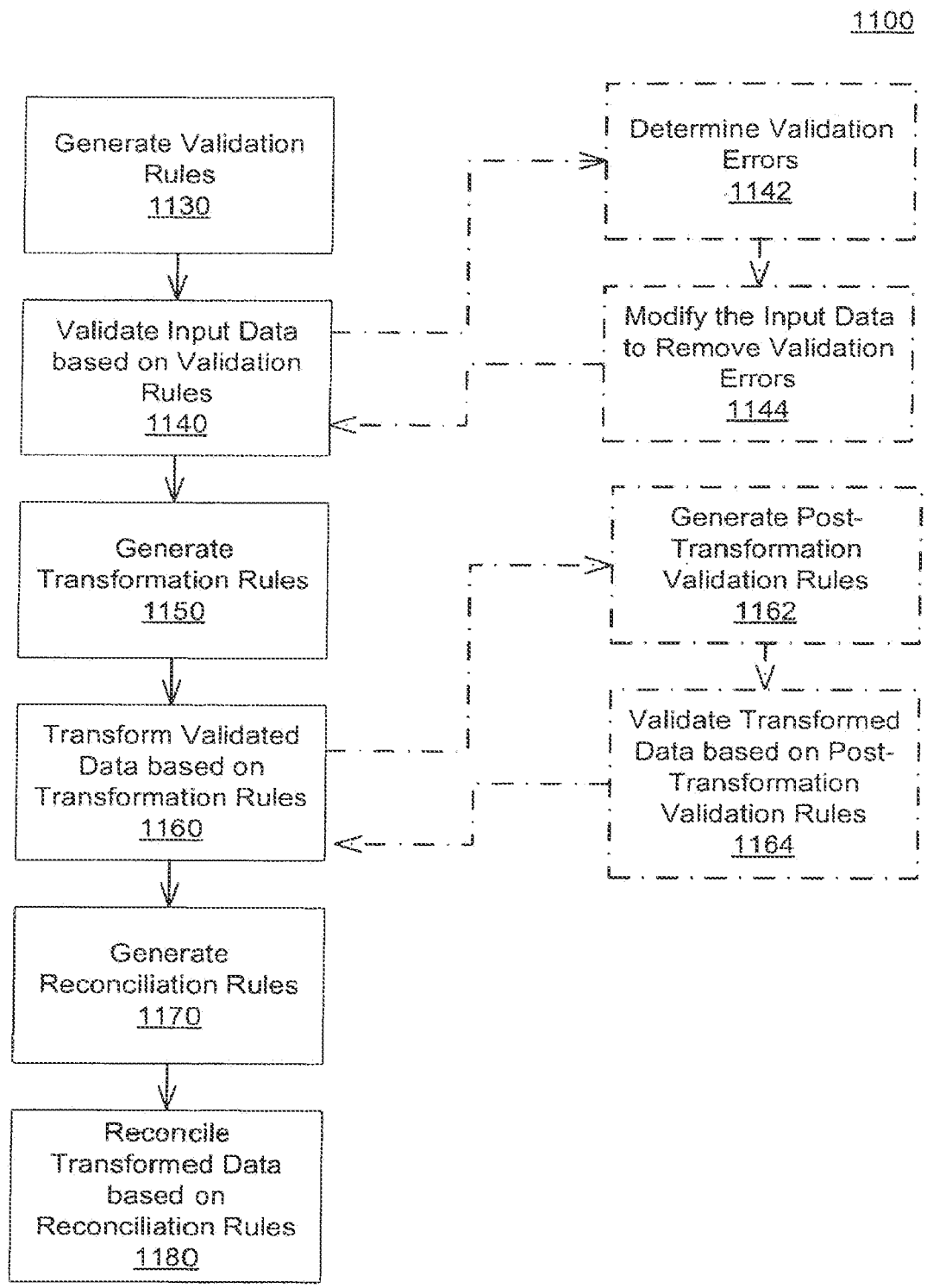
FIG. 11 is a flowchart of another exemplary process for data transition.

FIG. 11 is a flowchart 1100 of another exemplary process for data transition utilizing, for example, the mediation transition system 210 of FIG. 2. The validation rules engine 214 generates (1130) one or more validation rules based on the one or more predicates. The validation module 215 validates (1140) the input data based on the one or more validation rules. The validation module 215 determines (1142) one or more validation errors associated with the input data based on the one or more validation rules and/or modifies (1144) the input data to remove the one or more validation errors.

The transformation rules engine 216 generates (1050) one or more transformation rules based on the one or more predicates. The transformation module 217 transforms (1060) input data based on the one or more transformation rules. The validation rules engine 214 generates (1162) one or more post-transformation validation rules. The validation module 215 validates (1264) the transformed data based on the one or more post-transformation validation rules. The reconciliation rules engine 218 generates (1070) one or more reconciliation rules based on the one or more predicates. The reconciliation module 219 reconciles (1080) the transformed data with the destination databases based on the one or more reconciliation rules.

Figure 12:
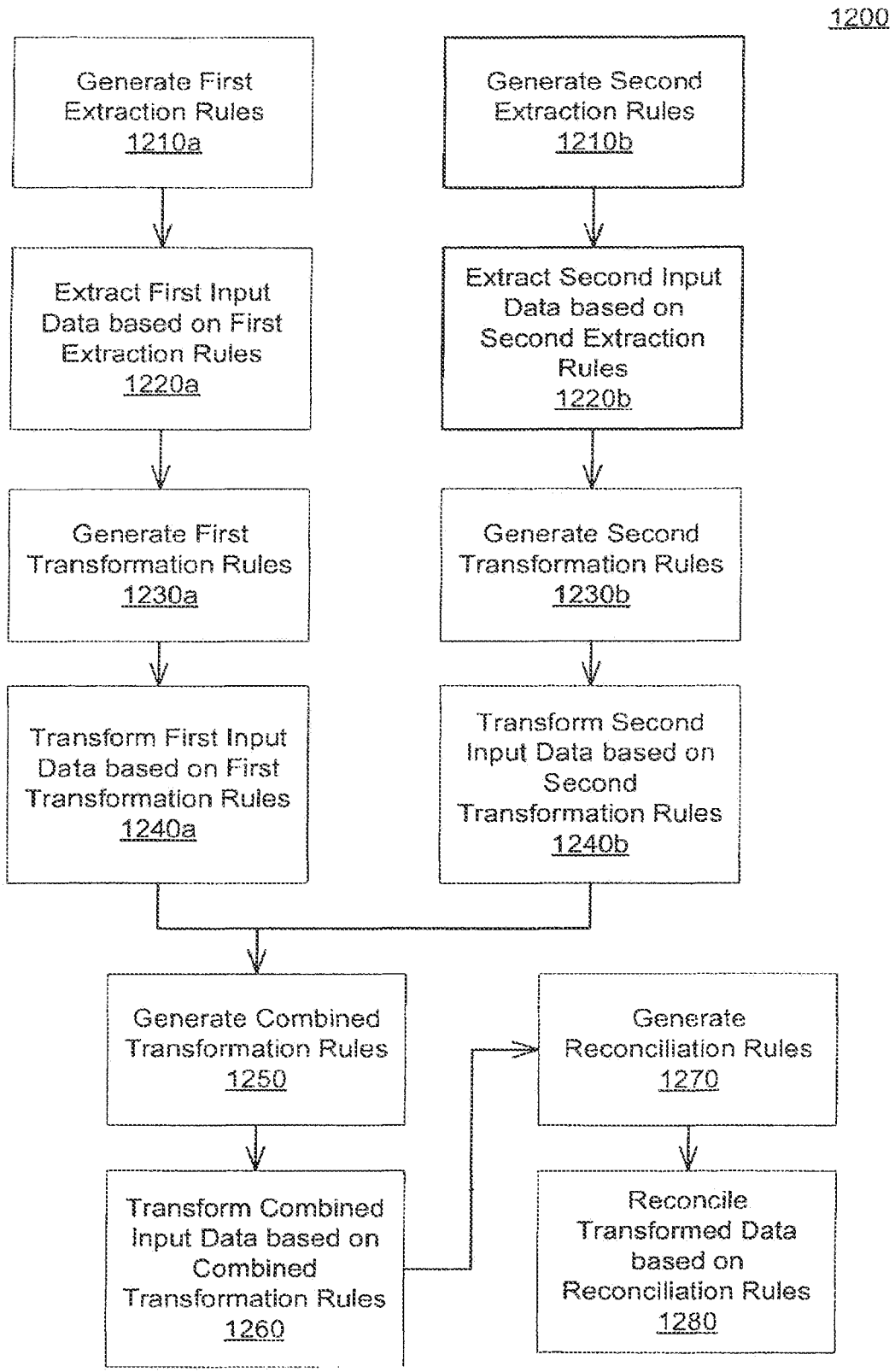
FIG. 12 is a flowchart of another exemplary process for data transition.

FIG. 12 is a flowchart 1200 of another exemplary process for data transition utilizing, for example, the mediation transition system 210 of FIG. 2. The source extraction rule engine 211 generates (1210*a* and 1210*b*) one or more first and second extraction rules based on the one or more predicates (e.g., concurrently, serially, dependent on each other, etc.). The source extraction module 212 extracts (1220*a* and 1220*b*) the first and second input data from one or more source databases based on the first and second extraction rules, respectively (e.g., concurrently, serially, dependent on each other, etc.).

The transformation rules engine 216 generates (1230*a* and 1230*b*) one or more first and second transformation rules based on the one or more predicates. The transformation module 217 transforms (1240*a* and 1240*b*) the first and second input data based on the one or more first and second transformation rules, respectively.

The transformation rules engine 216 generates (1250) one or more combined transformation rules based on the one or more predicates. The one or more combined transformation rules are associated with the combined first and second input data (e.g., logically combined, linked together, associated together, etc.). The transformation module 217 transforms (1260) the combined first and second input data based on the one or more combined transformation rules.

The reconciliation rules engine 218 generates (1270) one or more reconciliation rules based on the one or more predicates. The reconciliation module 219 reconciles (1280) the transformed combined data with the destination databases based on the one or more reconciliation rules.

For example, the transition process described in FIG. 12 transitions parts of the first data and the second data with an OSS database and parts of the first data and the second data with a customer billing database from a customer service database. In other words, in this example, source data from a plurality of sources is transitioned to a destination database. In other examples, source data from a plurality of sources is transitioned to a plurality of destination databases.

Although FIG. 12 does not illustrate validation, the exemplary process can include validation as described herein. In some examples, the validation rules engine 214 generates one or more first validation rules based on the one or more predicates. The validation module 215 validates the first input data based on the one or more first validation rules. The validation module 215 determines one or more first validation errors associated with the first input data based on the one or more first validation rules and/or modifies the first input data to remove the one or more second validation errors.

In other examples, the validation rules engine 214 generates one or more second validation rules based on the one or more predicates. The validation module 215 validates the second input data based on the one or more second validation rules. The validation module 215 determines one or more second validation errors associated with the second input data based on the one or more second validation rules and/or modifies the second input data to remove the one or more second validation errors.

In some examples, the validation rules engine 214 generates one or more first and second post-transformation validation rules. The validation module 215 validates the first and second transformed data based on the one or more first and second post-transformation validation rules, respectively.

In other examples, the transformation rules generation and execution, the validation rules generation and execution, the reconciliation rules generation and execution, and/or other data transition operations can occur in any order and/or any sequence utilizing the unified configuration. For example, the data transition can occur as follow: input data from four source databases is extracted based on two sets of one or more extraction rules; the input data from each source database is validated based on a single set of one or more validation rules; the validated data from each source database is transformed based on two sets of one or more transformation rules; the two sets of transformed data is further transformed based on one set of one or more combined transformation rules; the combined set of transformed data is reconciled with two destination databases based on a single set of one or more reconciliation rules; and the transformed data from each source database is reconciled to four different destination databases based on four different sets of one or more reconciliation rules. In this example, the data is transitioned between a plurality of source databases to a plurality of destination databases based on various rules and/or in various orders. Other examples of the number of rules and/or sequence of the order of the rule generation and/or execution can be utilized by the technology described herein.

In other examples, the technology enables the reuse of the knowledge domain via use of declarative style in configuration definition, thereby reducing the need for custom programming and increasing the efficiency of the transformation process. In other words, in some examples, the knowledge domains and rules are not coded inside a module and/or engine. The knowledge domains and/or rules can be used by other module and/or engine. In other examples, the modules and/or engines can use part of the unified configuration based on the need of the module/engine (e.g., use only SONET/SDH domain and ignore VPN domain, etc).

In some examples, the knowledge domain can be described regardless of its specific implementations (e.g., physical implementation, logical implementation, etc.). In this example, rules can be reused for different transformation projects, regardless if the rules are from Excel to MS SQL, Oracle to DB2, or MySQL to Informix, etc.

In other examples, the technology includes knowledge domain and/or rules management tools. The tools can enable easy configuration and/or export/import in any representation format. The technology can include a configuration editor. The configuration editor can include a knowledge domain editor, a rules editor, and/or a "Meta-rules" editor for validating of rules.

In some examples, the validation rules can include one or more entities definition checking (e.g., primary key existence, no duplicated attributes, etc.), relationships integrity checking (e.g., no duplication of relations, no circle relations with multiplicity impact, etc.), validation rules checking against schema definition (e.g., no contradiction of rules in schema and in entity set, etc.), and/or reconciliation rules checking against integrity with schema (e.g., existence of all required attributes and object-types, no cycle in parent-child relationships, etc.).

In other examples, the technology described herein can synchronize data between two or more data sources (e.g., databases, files, etc.). For example, the technology can be utilized to synchronize customer data between a customer relationship system and an operational support system. In some examples, the one or more destination databases can be, for example, any type (e.g., a relational DB, an object DB, an XML-based DB, a metadata-driven database, etc.).

In some examples, the technology described herein can utilize the following exemplary data definition: input data (SDB), validation rules, validated input data, transformation rules, transformed data, post-transformation validation rules, validated transformed data, reconciliation rules, and reconciled data.

Exemplary Unified Configuration (in XML notation)

```
<!-- Specifies 3 SDB tables (entities): BSCBoard, BSCBTSBoard and BSCDevice. -->
<configuration name="MyConfiguration"
    xmlns="http://www.netcracker.com/schemas/mediation/transition"
    xmlns:v="http://www.netcracker.comischemas/mediation/transitionivalidation"
    xmlns:tr="http://www.netcracker.com/schemas/mediation/transition/transformation"
    xmlns:rec="http://www.netcracker.com/schemas/mediation/transition/reconciliation">
```

```xml
<entity-set name="SDB">
  <entity name="BSCBoard">
    <attribute name="FDN"/>
    <attribute name="Serial_Number"/>
    <attribute name="Device" relation="Card to Device">
      <v:is-not-null name="IsNotNull 1 Validation Rule" majority."major"/>
    </attribute>
  </entity>
  <entity name="BSCBTSBoard">
    <attribute name="FDN"/>
    <attribute name="Serial_Number"/>
    <attribute name="Device" relation="Card to Device">
      <v:is-not-null name="IsNotNull 2 Validation Rule" majority="major"/>
    </attribute>
  </entity>
  <entity name="BSCDevice">
    <attribute name="Device"/>
    <attribute name="Name"/>
  </entity>
  <relationship name="Board to Device" multiplicity="0..1" direction="in">
    <source-entity>BSCBoard</source-entity>
    <destination-entity>Device</destination-entity>
  </relationship>
  <relationship name="Frame to Device" multiplicity="0,,1" direction="in">
    <source-entity>BSCBTSBoard</source-entity>
    <destination-entity>Device</destination-entity>
  </relationship>
</entity-set>
<entity-set name="IDB Entity Set">
  <rec:target-inventory name="Test Inventory Project"/>
  <entity name="Card" pk="Card ID">
    <rec:object-type nc-name="CARD" id="39509"/>
    <attribute name="Card ID">
      <tr:expression transformation="Card Transformation">
        <tr:source-attribute entity="BSCBoard" name="FDN"/>
      </tr:expression>
      <v:between majority="minor">
        <v:min>0</v:min>
        <v:max>10000</v:max>
      </v:between>
      <v:regexp-expression name="RegExp Validation Rule" majority="major">
        <v:expression>[[:digit:]]</v:expression>
      </v:regexp-expression>
      <rec:attr nc-name="CARD_ID" attr-id="39507"/>
    </attribute>
    <attribute name="Parent ID" relation="Card to Device">
      <tr:expression transformation="Card Transformation">
        <tr:source-attribute entity="BSCBoard" name="Device"/>
      </tr:expression>
      <rec:attr nc-name="PARENT_ID" attr-id="39506"/>
    </attribute>
    <attribute name="Name" type="string">
      <tr:expression transformation="Card Transformation" merge-rule="'Card_'11F_SNII'-'II B SN">
        <ft:source-attribute entity="BSCBTSBoard" name="Serial Number" alias="F_SN"/>
        <ft:source-attribute entity----"BSCBoard" name="Serial Number" alias="B SN"/>
      </tr:expression>
      <rec:attr nc-name="NAME" attr-id="1234569"/>
    </attribute>
    <tr:transformation name="Card Transformation">
      <tr:source-entity name="BSCBTSBoard" alias="BTS"/>
      <tr:source-entity name="BSCBoard" alias="BSC"/>
      <ft:source-entity name="BSCDevice" alias="DEV"/>
      <tr:join-condition name="By Device">
        <ft:source-attribute>BTS.Device</tcsource-attribute>
        <trsource-attribute>BSC.Device</tr:source-attribute>
      </tr:join-condition>
      <tr:filter name="Is not null filter" condition="IS NOT NULL">
        <ft:source-attribute>DEV.Device</tr:source-attribute>
      </tr:filter>
    </tr:transformation>
  </entity>
  <entity name="Device" pk="Device ID">
    <rec:object-type nc-name="DEVICE" id="39508"/>
    <attribute name="Name">
      <tr:expression transformation="Device Transformation">
        <tr:source-attribute entity="BSCDevice" name="Name"/>
```

-continued

```
      </tr:expression>
      <v:like name="Like Validation Rule" majority="major">
        <v:expression>Dev%</v:expression>
      </v:like>
    </attribute>
    <attribute name="Device ID" relation="Card to Device">
      <tr:expression transformation="Device Transformation">
        <tr:source-attribute entity="BSCDevice" name="Device"/>
      </tr:expression>
      <rec:attr nc-name="DEVICE_ID" attr-id="39505"/>
    </attribute>
    <tr:transformation name="Device Transformation">
      <tr:source-entity name="BSCDevice" alias="DEV"/>
      <tr:filter name="Is not null filter" condition="IS NOT NULL">
        <trsource-attribute>DEV.Device</tr:source-attribute>
      </tr:filter>
    <kr:transformation>
    </entity>
    <relationship name="Card to Device" multiplicity="0..1" direction="in">
      <source-entity>Card</source-entity>
      <desti nation-entity>Device</destination-entity>
    </relationship>
  </entity-set>
</configuration>
```

Exemplary Input Data
BSCBoard

|   | FDN | Serial Number | Device |
|---|-----|---------------|--------|
| 1 | 1   | 77221         | 1      |
| 2 | 2   | 77222         | NULL   |
| 3 | 3   | 77223         | 3      |
| 4 | 4   | 77224         | 2      |

Comment: BSCBoard is a kind of motherboard. Every entity of this type can include a unique identifier on BSCBoard level (in this example, FDN), a unique identifier on entity set level (in this example, Serial Number), and/or a link to a Device.
BSCBTSBoard

|   | FDN | Serial Number | Device |
|---|-----|---------------|--------|
| 1 | 1   | 77225         | 2      |
| 2 | 2   | 77226         | 3      |
| 3 | 3   | 77227         | NULL   |
| 4 | 4   | 77228         | 1      |

Comment: BSCBTSBoard is another kind of motherboard. Every entity of this type can include a unique identifier on BSCBTSBoard level (in this example, FDN), a unique identifier on entity set level (in this example, Serial Number) and a link to Device.

BSCDevice

|   | Device | Name      |
|---|--------|-----------|
| 1 | 1      | Dev_1     |
| 2 | 2      | Dev_2     |
| 3 | 3      | Dev_3     |
| 4 | 11     | Device-11 |

Comment: The BSCDevice table includes information about devices: unique identifier (in this example, Device id) and a name of the device (in this example, Name).

Exemplary Validation Rules

<!--The validation rules define the validation of the source data. The validation rules specify 2 field level validation rules of type "Is Not Null". These rules check values of attributes Device in BSCBoard and Device in BSCBTS-Board and delete all rows where the value is NULL.-->

```
<configuration name="MyConfiguration"
    xmlns="http://www.netcracker.com/schemas/mediation/transition"
    xmlns:v="http://www.netcracker.com/schemas/mediation/transition/validation"
    xmlns:tr="http://www.netcracker.com/schemas/mediation/transition/transformation"
    xmlns:rec="http://www.netcracker.com/schemas/mediation/transition/reconciliation">
  <entity-set name="SDB">
    <entity name="BSCBoard">
      <attribute name="FDN"/>
      <attribute name="Serial_Number"/>
      <attribute name="Device" relation="Card to Device">
        <v name="IsNotNull 1 Validation Rule" majority="major"/>
      </attribute>
    </entity>
    <entity name="BSCBTSBoard">
      <attribute name="FDN"/>
      <attribute name="Serial_Number"/>
      <attribute name="Device" relation="Card to Device">
        <v:is-not-null name="IsNotNull 2 Validation Rule" majority="major"I>
      </attribute>
    </entity>
```

```
<entity name="BSCDevice">
  <attribute name="Device"/>
  <attribute name="Name"/>
</entity>
<relationship name="Board to Device" multiplicity="0..1" direction="in">
  <source-entity>BSCBoard</source-entity>
  <destination-entity>Device</destination-entity>
</relationship>
<relationship name="Frame to Device" multiplicity="0..1" direction="in">
  <source-entity>BSCBTSBoard</source-entity>
  <destination-entity>Device</destination-entity>
</relationship>
</entity-set>
<entity-set name="IDB Entity Set">
  <rec:target-inventory name="Test Inventory Project"/>
  <entity name="Card" pk="Card ID">
    <rec:object-type nc-name="CARD" id="39509"/>
    <attribute name="Card ID">
      <tr:expression transformation="Card Transformation">
        <tr:source-attribute entity="BSCBoard" name="FDN"/>
      </tr:expression>
      <v:between majority="minor">
        <v:min>0</v:min>
        <v:max>10000</v:max>
      </v:between>
      <v:regexp-expression name="RegExp Validation Rule" majority="major">
        <v:expression>[[:digit:]]</v:expression>
      </v:regexp-expression>
      <rec:attr nc-name="CARD_ID" attr-id="39507"/>
    </attribute>
    <attribute name="Parent ID" relation="Card to Device">
      <tr:expression transformation="Card Transformation">
        <tnsource-attribute entity="BSCBoard" name="Device"/>
      </tnexpression>
      <rec:attr nc-name="PARENT_ID" attr-id="39506"/>
    </attribute>
    <attribute name="Name" type="string">
      <tr:expression transformation="Card Transformation" merge-rule="'Card_'I1F_SNII'-'II B_SN">
        <tr:source-attribute entity="BSCBTSBoard" name="Serial Number" alias="F_SN"/>
        <tr:source-attribute entity="BSCBoard" name="Serial Number" alias="B_SN"/>
      </tr:expression>
      <rec:attr nc-name="NAME" attr-id="1234569"/>
    </attribute>
    <firtransformation name="Card Transformation">
      <tr:source-entity name="BSCBTSBoard" alias="BTS"I>
      <tr:source-entity name="BSCBoard" alias="BSC"/>
      <tr:source-entity name="BSCDevice" alias="DEV"/>
      <tr:join-condition name="By Device">
        <tr:source-attribute>BTS.Device</tr:source-attribute>
        <tr:source-attribute>BSC.Device</tr:source-attribute>
      </tr:join-condition>
      <tr:filter name="Is not null filter" condition="IS NOT NULL">
        <tr:source-attribute>DEV.Device</tr:source-attribute>
      </tr:filter>
    </tr:transformation>
  </entity>
  <entity name="Device" pk="Device ID">
    <rec:object-type nc-name="DEVICE" id="39508"/>
    <attribute name="Name">
      <tr:expression transformation="Device Transformation">
        <tr:source-attribute entity="BSCDevice" name="Name"/>
      </tr:expression>
      <v:like name="Like Validation Rule" majority="major">
        <v:expression>Dev%</v:expression>
      </v:like>
    </attribute>
    <attribute name="Device ID" relation="Card to Device">
      <tr:expression transformation="Device Transformation">
        <tr:source-attribute entity="BSCDevice" name="Device"/>
      </tr:expression>
      <rec:attr nc-name="DEVICE_ID" attr-id="39505"/>
    </attribute>
    <tr:transformation name="Device Transformation">
      <tr:source-entity name="BSCDevice" alias="DEV"/>
      <tr:filter name="Is not null filter" condition="IS NOT NULL">
        <tr:source-attribute>DEV.Device</trsource-attribute>
```

-continued

```
      </tr:filter>
    </tr:transformation>
  </entity>
  <relationship name="Card to Device" multiplicity="0..1" direction="in">
    <source-entity>Card</source-entity>
    <destination-entity>Device</destination-entity>
  </relationship>
  </entity-set>
</configuration>
```

Exemplary Validated Input Data (Validated SDB)
BSCBoard

|   | FDN | Serial Number | Device |   |
|---|---|---|---|---|
| 1 | 1 | 77221 | 1 |   |
| 2 | 2 | 77222 | NULL | Deleted according to "IsNotNull 1 Validation Rule" |
| 3 | 3 | 77223 | 3 |   |
| 4 | 4 | 77224 | 2 |   |

BSCBTSBoard

|   | FDN | Serial Number | Device |   |
|---|---|---|---|---|
| 1 | 1 | 77225 | 2 |   |
| 2 | 2 | 77226 | 3 | " |
| 3 | 3 | 77227 | NULL | Deleted according to "IsNotNull 2 Validation Rule" |
| 4 | 4 | 77228 | 1 |   |

BSCDevice

|   | Device | Name |
|---|---|---|
| 1 | 1 | Dev_1 |
| 2 | 2 | Dev_2 |
| 3 | 3 | Dev_3 |
| 4 | 11 | Device-11 |

Exemplary Transformation Rules

<!--The transformation rules can, for example, specify 2 IDB tables (entities) Card and Device. Every row in table Card can include information about identifier (Card ID), parent device (Parent ID), and/or card name (Name). Every row in table Device can include information about name and identifier of device (Name and Device ID columns).-->

```
<configuration name="MyConfiguration"
    xmlns="http://www.netcracker.com/schemas/mediation/transition"
    xmlns:v="http://www.netcracker.corn/schemas/mediation/transition/validation"
    xmlns:tr="http://www.netcracker.com/schemas/mediation/transition/transformation"
    xmlns:rec="http://www.netcracker.com/schemas/mediation/transition/reconciliation">
<entity-set name="SDB">
  <entity name="BSCBoard">
    <attribute name="FDN"/>
    <attribute name="Serial_Number"/>
    <attribute name="Device" relation="Card to Device">
      <v:is-not-null name="IsNotNull 1 Validation Rule" majority="major"/>
    </attribute>
  </entity>
  <entity name="BSCBTSBoard">
    <attribute name="FDN"/>
    <attribute name="Serial_Number"/>
    <attribute name="Device" relation="Card to Device">
      <v:is-not-null name="IsNotNull 2 Validation Rule" majority="major"/>
    </attribute>
  </entity>
  <entity name="BSCDevice">
    <attribute name="Device"/>
    <attribute name="Name"/>
  </entity>
  <relationship name="Board to Device" multiplicity="0..1" direction="in">
    <source-entity>B SCBoard</source-entity>
    <destination-entity>Device</destination-entity>
  </relationship>
  <relationship name="Frame to Device" multiplicity="0..1" direction="in">
    <source-entity>B SCBTSBoard</source-entity>
    <destination-entity>Device</destination-entity>
  </relationship>
</entity-set>
<entity-set name="IDB Entity Set">
  <rec:target-inventory name="Test Inventory Project"/>
  <entity name="Card" pk="Card ID">
    <rec:object-type nc-name="CARD" id="39509"/>
```

-continued

```xml
<attribute name="Card ID">
    <tr:expression transformation="Card Transformation">
        <tr:source-attribute entity="BSCBoard" name="FDN"/>
    </tr:expression>
    <v:between majority="minor">
        <v:min>0</v:min>
        <v:max>10000</v:max>
    </v:between>
    <v:regexp-expression name="RegExp Validation Rule" majority="major">
        <v:expression>[[:digit:]]</v:expression>
    </v:regexp-expression>
    <rec:attr nc-name="CARD_ID" attr-id="39507"/>
</attribute>
<attribute name="Parent ID" relation="Card to Device">
    <tr:expression transformation="Card Transformation">
        <tnsource-attribute entity="BSCBoard" name="Device"/>
    </tr:expression>
    <rec:attr nc-name="PARENT_ID" attr-id="39506"/>
</attribute>
<attribute name="Name" type="string">
    <tr:expression transformation="Card Transformation" merge-rule="'Card_'11F_SNII'-'11 B_SN">
        <tr:source-attribute entity="BSCBTSBoard" name="Serial Number" alias="F_SN"/>
        <tr:source-attribute entity="BSCBoard" name="Serial Number" alias="B_SN"/>
    </tr:expression>
    <rec:attr nc-name="NAME" attr-id="1234569"/>
</attribute>
<tr:transformation name="Card Transformation">
    <tr:source-entity name="BSCBTSBoard" alias="BTS"/>
    <tr:source-entity name="BSCBoard" alias="BSC"I/>
    <tr:source-entity name="BSCDevice" alias="DEV"/>
    <tr:join-condition name="By Device">
        <tr:source-attribute>BTS.Device<Ansource-attribute>
        <tr:source-attribute>BSC.Device</tnsource-attribute>
    </tr:join-condition>
    <tr:filter name="Is not null filter" condition="IS NOT NULL">
        <tr:source-attribute>DEV.Device</tnsource-attribute>
    </tr:filter>
</tr:transformation>
</entity>
<entity name="Device" pk="Device ID">
    <rec:object-type nc-name="DEVICE" id="39508"/>
    <attribute name="Name">
        <tr:expression transformation="Device Transformation">
            <tr:source-attribute entity="BSCDevice" name="Name"/>
        </tr:expression>
        <v:like name="Like Validation Rule" majority="major">
            <v:expression>Dev%</v:expression>
        </v:like>
    </attribute>
    <attribute name="Device ID" relation="Card to Device">
        <tr:expression transformation="Device Transformation">
            <tnsource-attribute entity="BSCDevice" name="Device"/>
        </tr:expression>
        <rec:attr nc-name="DEVICE_ID" attr-id="39505"/>
    </attribute>
    <tr:transformation name="Device Transformation">
        <tcsource-entity name="BSCDevice" alias="DEV"/>
        <tr:filter name="Is not null filter" condition="IS NOT NULL">
            <tr: source-attribute>DEV.Device</tr:source-attribute>
        </tr:filter>
    </tr: transformation>
</entity>
<relationship name="Card to Device" multiplicity="0..1" direction="in">
    <source-entity>Card</source-entity>
    <destination-entity>Device</destination-entity>
</relationship>
</entity-set>
</configuration>
<!-- Transformation SDB to IDB: This section defines process of transformation source tables to
destination intermediate tables. It specifies 2 transformations (one on each destination table)
"Card Transformation" and "Device Transformation". Each column of IDB tables has special
transformation level attribute (tr:expression) which defines source columns.-->
<configuration name="MyConfiguration"
    xmlns="http://www.netcracker.com/schemas/mediation/transition"
```

```
    xmlns:v="http://www.netcracker.com/schemas/mediation/transition/vali dation"
    xmlns:tr="http://www.netcracker.com/schemas/mediation/transition/transformation"
    xmlns:rec="http://www.netcracker.com/schemas/mediation/transition/reconciliation">
<entity-set name="SDB">
  <entity name="BSCBoard">
    <attribute name="FDN"/>
    <attribute name="SerialNumber"/>
    <attribute name="Device" relation="Card to Device">
      <v:is-not-null name="IsNotNull 1 Validation Rule" majority="major"/>
    </attribute>
  </entity>
  <entity name="BSCBTSBoard">
    <attribute name="FDN"/>
    <attribute name="Serial_Number"/>
    <attribute name="Device" relation="Card to Device">
      <v:is-not-null name="IsNotNull 2 Validation Rule" majority="major"/>
    </attribute>
  </entity>
  <entity name="BSCDevice">
    <attribute name="Device"/>
    <attribute name="Name"/>
  </entity>
  <relationship name="Board to Device" multiplicity="0..1" direction="in">
    <source-entity>BSCBoard</source-entity>
    <destination-entity>Device</destination-entity>
  </relationship>
  <relationship name="Frame to Device" multiplicity="0..1" direction="in">
    <source-entity>BSCBTSBoard</source-entity>
    <destination-entity>Device</destination-entity>
  </relationship>
</entity-set>
<entity-set name="IDB Entity Set">
  <rec:target-inventory name="Test Inventory Project"/>
  <entity name="Card" pk="Card ID">
    <rec:object-type nc-name="CARD" id="395097"/>
    <attribute name="Card ID">
      <tr:expression transformation="Card Transformation">
        <tr:source-attribute entity="BSCBoard" name="FDN"/>
      <itnexpression>
      <v:between majority="minor">
        <v:min>0</v:min>
        <v:max>10000</v:max>
      </v:between>
      <v:regexp-expression name="RegExp Validation Rule" majority="major">
        <v:expression>[[:digit:]]</v:expression>
      </v:regexp-expression>
      <rec:attr nc-name="CARD_ID" attr-id="39507"/>
    </attribute>
    <attribute name="Parent ID" relation="Card to Device">
      <tr:expression transformation="Card Transformation">
        <tr:source-attribute entity="BSCBoard" name="Device"/>
      </tr:expression>
      <rec:attr nc-name="PARENT_ID" attr-id="39506"/>
    </attribute>
    <attribute name="Name" type="string">
      <tr:expression transformation="Card Transformation" merge-
rule="'Card_11F_SNII'-'11 B_SN">
        <tr:source-attribute entity="BSCBTSBoard" name="Serial Number"
alias="F_SN"/>
        <tr:source-attribute entity="BSCBoard" name="Serial Number"
alias="B_SN"/>
      <Jtr:expression>
      <rec:attr nc-name="NAME" attr-id="1234569"/>
    </attribute>
    <tr:transformation name="Card Transformation">
      <tr:source-entity name="BSCBTSBoard" alias="BTS"/>
      <tr:source-entity name="BSCBoard" alias="BSC"I>
      <tr:source-entity name="BSCDevice" alias="DEV"I>
      <tr:join-condition name="By Device">
        <tr:source-attribute>BTS.Device<itr:source-attribute>
        <tr:source-attribute>BSC.Device</tr:source-attribute>
      </tr:join-condition>
      <tr:filter name="Is not null filter" condition="IS NOT NULL">
        <tr:source-attribute>DEV.Device</tr:source-attribute>
      </tr:filter>
    </tr:transformation>
  </entity>
  <entity name="Device" pk="Device ID">
    <rec:object-type nc-name="DEVICE" id="39508"/>
    <attribute name="Name">
      <tr:expression transformation="Device Transformation">
```

-continued

```
         <tr:source-attribute entity="BSCDevice" name="Name"/>
      </tr:expression>
      <v:like name="Like Validation Rule" majority="majoe>
         <v:expression>Dev%</v:expression>
      </v:like>
   </attribute>
   <attribute name="Device ID" relation="Card to Device">
      <tr:expression transformation="Device Transformation">
         <tr:source-attribute entity="BSCDevice" name="Device"I>
      </tr: expression>
      <rec:attr nc-name="DEVICE_ID" attr-id="39505"/>
   </attribute>
   <tr:transformation name="Device Transformation">
      <tr:source-entity name="BSCDevice" alias="DEV"/>
      <tr:filter name="Is not null filter" condition="IS NOT NULL">
         <tr:source-attribute>DEV.Device</tr:source-attribute>
      </tr:filter>
   </tr:transformation>
 </entity>
 <relationship name="Card to Device" multiplicity="0..1" direction="in">
   <source-entity>Card</source-entity>
   <destination-entity>Device</destination-entity>
 </relationship>
</entity-set>
</configuration>
```

Exemplary Transformed Data (IDB)
Card—The Card table created via transformation of source tables BSCBoard and BSCBTSBoard.

|   | Card ID | Parent ID | Name |   |
|---|---------|-----------|------|---|
| 1 | 1 | 1 | Card_77221_77228 | Card ID=BSCBoard.FDN Parent ID=BSCBoard.Device Name=Card'_'+BSCBoard.Serial Number+'-'+BSCBTSBoard.Serial Number (where BSCBoard.Device=BSCBTSBoard.Device) |
| 2 | 2 | 3 | Card_77223_77226 | Card ID=BSCBoard.FDN Parent ID=BSCBoard.Device Name=Card'_'+BSCBoard.Serial Number+'-'+BSCBTSBoard.Serial Number (where BSCBoard.Device=BSCBTSBoard.Device) |
| 3 | 4 | 2 | Card_77224_77225 |   |

Device—The device table created via transformation of source table BSCDevice.

|   | Device ID | Name |   |
|---|-----------|------|---|
| 1 | 1 | Dev_1 | All data from table BSCDevice was inserted into this table. The additional filter "Is not null filter" did not work because there are no NULL values in source column Device. |
| 2 | 2 | Dev_2 |   |
| 3 | 3 | Dev_3 |   |
| 4 | 11 | Device-11 |   |

Exemplary Post-Transformation Validation Rules

<!--The post-transformation validation rules define validation of transformed data (IDB). This process of validation is similar to Validation of SDB. The post-transformation validation rules specify 3 validation rules "Between Validation Rule", "RegExp Validation Rule" and "Like Validation Rule". Each validation rules checks values in corresponded columns in accordance with defined expression. For example, the RegExp Validation Rule" requires that value of column "Card ID" should be only number type, because expression equals [[:digit:]].--><configuration name="MyConfiguration"

```
xmlns="http://www.netcracker.com/schemas/mediation/transition"
xmlns:v="http://www.netcracker.com/schemas/mediation/transition/validation"
xmlns:tr="http://www.netcracker.com/schemas/mediation/transition/transformation"
xmlns:rec="http://www.netcracker.com/schemas/mediation/transition/reconciliation">
<entity-set name="SDB">
   <entity name="BSCBoard">
      <attribute name="FDN"/>
      <attribute name="SerialNumber"/>
      <attribute name="Device" relation="Card to Device">
         <v:is-not-null name="IsNotNull 1 Validation Rule" majority="major"/>
```

```xml
    </attribute>
  </entity>
  <entity name="BSCBTSBoard">
    <attribute name="FDN"/>
    <attribute name="Serial_Number"/>
    <attribute name="Device" relation="Card to Device">
      <v:is-not-null name="IsNotNull 2 Validation Rule" majority="major"/>
    </attribute>
  </entity>
  <entity name="BSCDevice">
    <attribute name="Device"/>
    <attribute name="Name"/>
  </entity>
  <relationship name="Board to Device" multiplicity="0..1" direction="in">
    <source-entity>BSCBoard</source-entity>
    <destination-entity>Device</destination-entity>
  </relationship>
  <relationship name="Frame to Device" multiplicity="0..1" direction="in">
    <source-entity>BSCBTSBoard</source-entity>
    <destination-entity>Device</destination-entity>
  </relationship>
</entity-set>
<entity-set name="IDB Entity Set">
  <rec:target-inventory name="Test Inventory Project"/>
  <entity name="Card" pk="Card ID">
    <rec:object-type nc-name="CARD" id="39509"/>
    <attribute name="Card ID">
      <tr:expression transformation="Card Transformation">
        <tnsource-attribute entity="BSCBoard" name="FDN"/>
      </tr:expression>
      <v:between majority="minor">
        <v:min>0</v:min>
        <v:max>10000</v:max>
      </v:between>
      <v:regexp-expression name="RegExp Validation Rule" majority="major">
        <v:expression>[[:digit:]]</v:expression>
      </v:regexp-expression>
      <rec:attr nc-name="CARD_ID" attr-id="39507"/>
    </attribute>
    <attribute name="Parent ID" relation="Card to Device">
      <tr:expression transformation="Card Transformation">
        <tnsource-attribute entity="BSCBoard" name="Device"/>
      </tr:expression>
      <rec:attr nc-name="PARENT_ID" attr-id="39506"/>
    </attribute>
    <attribute name="Name" type="string">
      <tr:expression transformation="Card Transformation" merge-rule=Card_111F_SNIEYII_B_SN">
        <tr:source-attribute entity="BSCBTSBoard" nam6="Serial Number" alias="F SN"/>
        <tr:source-attribute entity="BSCBoard" name="Serial Number" alias="B_SN"/>
      </tr:expression>
      <rec:attr nc-name="NAME" attr-id="1234569"/>
    </attribute>
    <tr:transformation name="Card Transformati on">
      <tr:source-entity name="BSCBTSBoard" alias="BTS"/>
      <tr:source-entity name="BSCBoard" alias="BSC"/>
      <tr:source-entity name="BSCDevice" alias="DEV"/>
      <tr:join-condition name="By Device">
        <tr:source-attribute>B TS.Device</tr:source-attribute>
        <tr:source-attribute>BSC.Device</tr:source-attribute>
      </tr:join-condition>
      <tr:filter name="Is not null filter" condition="IS NOT NULL"> '<tr:source-attribute>DEV.Device<Ansource-attribute>
      </tr:filter>
    </tr:transformation>
  </entity>
  <entity name="Device" pk="Device ID">
    <rec:object-type nc-name="DEVICE" id="39508"/>
    <attribute name="Name">
      <tr:expression transformation="Device Transformation">
        <tr:source-attribute entity="BSCDevice" name="Name"/>
      </tr:expression>
      <v:like name="Like Validation Rule" majority="major">
        <v:expression>Dev%</v:expression>
      </v:like>
    </attribute>
    <attribute name="Device ID" relation="Card to Device">
      <tr:expression transformation="Device Transformation">
```

-continued

```
            <trsource-attribute entity="BSCDevice" name="Device"/>
          </tr:expression>
          <rec:attr nc-name="DEVICE_ID" attr-id="39505"/>
        </attribute>
        <tr:transformation name="Device Transformation">
          <tr:source-entity name="BSCDevice" alias="DEV"/>
          <tr:filter name="Is not null filter" condition="IS NOT NULL">
            <tr: source-attribute>DEV.Device</tr: source-attribute>
          </tr:filter>
        </tr: transformation>
      </entity>
      <relationship name="Card to Device" multiplicity="0..1" direction="in">
        <source-entity>Card</source-entity>
        <destination-entity>Device</destination-entity>
      </relationship>
    </entity-set>
</configuration>
```

Exemplary Validated Transformed Data

Card

| | Card ID | Parent ID | Name | |
|---|---|---|---|---|
| 1 | 1 | 1 | Card_77221_77228 | All values are satisfied to validation rules "Between validation rule" and "RegExp Validation Rule" |
| 2 | 2 | 3 | Card_77223_77226 | All values are satisfied to validation rules "Between validation rule" and "RegExp Validation Rule" |
| 3 | 4 | 2 | Card_77224_77225 | |

Device

| | Card ID | Parent ID | Name |
|---|---|---|---|
| 1 | 1 | Dev_1 | |
| 2 | 2 | Dev_2 | |
| 3 | 3 | Dev_3 | |
| 4 | 11 | Device-11 | Deleted according to the "Like Validation Rule" |
| 5 | 4 | Dev_4 | |

Exemplary Reconciliation Rules

<!--The reconciliation rules specify, on top level, 2 IDB tables (entities) Card and Device. Each entity is reconciled, correspondingly, rows of table "NC_OBJECTS" in destination DB, by specifiyng xml attribute nc-name=CARD and DEVICE. Then, under each mapping between IDB entity and object-type, the reconciliation rules specify what attribute from IDB reconciled with what atribute in destination DB. Some columns in NC OBJECTS for certain rows can be filled automatically without binding to the destination attribute.-->

```
<configuration name="MyConfiguration"
xmlns="http://www.netcracker.com/schemas/mediation/transition"
xmlns:v="http://www.netcracker.com/schemas/mediationitransition/validation"
xmlns:tr="http://www.netcracker.com/schemas/mediation/transition/transformation"
xmlns:rec="http://www.netcracker.com/schemas/mediation/transition/reconciliation">
    <entity-set name="SDB">
      <entity name="BSCBoard">
        <attribute name="FDN"/>
        <attribute name="Serial_Number"/>
        <attribute name="Device" relation="Card to Device">
          <v:is-not-null name="IsNotNull 1 Validation Rule" majority="major"/>
        </attribute>
      </entity>
      <entity name="BSCBTSBoard">
        <attribute name="FDN"/>
        <attribute name="Serial_Number"/>
        <attribute name="Device" relation="Card to Device">
          <v:is-not-null name="IsNotNull 2 Validation Rule" majority="major"/>
        </attribute>
      </entity>
      <entity name="BSCDevice">
        <attribute name="Device"/>
        <attribute name="Name"/>
      </entity>
      <relationship name="Board to Device" multiplicity="0..1" direction="in">
        <source-entity>BSCBoard</source-entity>
        <destination-entity>Device</destination-entity>
      </relationship>
      <relationship name="Frame to Device" multiplicity="0..1" direction="in">
          <source-entity>B SCBTSBoard</source-entity>
          <destination-entity>Device</destination-entity>
```

```xml
        </relationship>
    </entity-set>
    <entity-set name="IDB Entity Set">
        <rec:target-inventory name="Test Inventory Project"/>
        <entity name="Card" pk="Card ID">
            <rec:object-type nc-name="CARD" id="39509"/>
            <attribute name="Card ID">
                <tr:expression transformation="Card Transformation">
                    <tr:source-attribute entity="BSCBoard" name="FDN"/>
                </tr:expression>
                <v:between majority="minor">
                    <v:min>0</v:min>
                    <v:max>10000</v:max>
                </v:between>
                <v:regexp-expression name="RegExp Validation Rule" majority="major">
                    <v:expression>[1:digit:1]</v:expression>
                </v:regexp-expression>
                <rec:attr nc-name="CARD_ID" attr-id="39507"/>
            </attribute>
            <attribute name="Parent ID" relation="Card to Device">
                <tr:expression transformation="Card Transformation">
                    <tr:source-attribute entity="BSCBoard" name="Device"/>
                </tr:expression>
                <rec:attr nc-name="PARENT_ID" attr-id="39506"/>
            </attribute>
            <attribute name="Name" type="string">
                <tr:expression transformation="Card Transformation" merge-rule="'Card_'11F_SNII'-'II B_SN">
                    <tr:source-attribute entity="BSCBTSBoard" name="Serial Number" alias="F_SN"/>
                    <tr:source-attribute entity="BSCBoard" name="Serial Number" alias="B_SN"/>
                </tr:expression>
                <rec:attr nc-name="NAME" attr-id="1 234569"/>
            </attribute>
            <tr:transformation name="Card Transformation">
                <tr:source-entity name="BSCBTSBoard" alias="BTS"/>
                <tr:source-entity name="BSCBoard" alias="BSC"/>
                <tr:source-entity name="BSCDevice" alias="DEV"I>
                <tr:join-condition name="By Device">
                    <tr:source-attribute>BTS.Device</tr:source-attribute>
                    <tr:source-attribute>B SC.Device</tr: source-attribute>
                </trjoin-condition>
                <tr:filter name="Is not null filter" condition="IS NOT NULL">
                    <tr:source-attribute>DEV.Device<hrsource-attribute>
                </tr:filter>
            </tr:transformation>
        </entity>
        <entity name="Device" pk="Device ID">
            <rec:object-type nc-name="DEVICE" id="39508"/>
            <attribute name="Name">
                <tnexpression transformation="Device Transformation">
                    <tr:source-attribute entity."BSCDevice" name="Name"/>
                </tr:expression>
                <v:like name="Like Validation Rule" majority="major">
                    <v:expression>Dev%</v:expression>
                <iv:like>
            </attribute>
            <attribute name="Device ID" relation="Card to Device">
                <tr:expression transformation="Device Transformation">
                    <tr:source-attribute entity="BSCDevice" name="Device"/>
                </tr:expression>
                <rec:attr nc-name="DEVICE_ID" attr-id="39505"/>
            </attribute>
            <tr:transformation name="Device Transformation">
                <tr:source-entity name="BSCDevice" alias="DEV"/>
                <tr:filter name="Is not null filter" condition="IS NOT NULL">
                    <tr:source-attribute>DEV.Device</tnsource-attribute>
                </tr:filter>
            </tr:transformation>
        </entity>
        <relationship name="Card to Device" multiplicity="0..1" direction="in">
            <source-entity>Card</source-entity>
            <destination-entity>Device</destination-entity>
        </relationship>
    </entity-set>
</configuration>
```

Exemplary Reconciled Data
NC_OBJECT_TYPES

| | OBJECT_TYPE_ID | NAME | |
|---|---|---|---|
| 1 | 39508 | DEVICE | Mapped to existed in NC Object Type |
| 2 | 39509 | CARD | Mapped to existed in NC Object Type |

NC_ATTRIBUTES

| | ATTR_ID | NAME | |
|---|---|---|---|
| 1 | 39505 | DEVICE_ID | Mapped to existed in NC Attribute |
| 2 | 39506 | PARENT_ID | Mapped to existed in NC Attribute |
| 3 | 39507 | CARD_ID | Mapped to existed in NC Attribute |

NC_OBJECTS

| | OBJECT_TYPE_ID | NAME | OBJECT_TYPE_ID | |
|---|---|---|---|---|
| 1 | 39510 | Card__77221-77228 | 39509 | OBJECT_ID generated automatically; NAME is filled from attribute "Name" |
| 2 | 39511 | Card__77223-77226 | 39509 | |
| 3 | 39512 | Card__77224-77225 | 39509 | |
| 4 | 39513 | Dev__1 | 39508 | OBJECT_ID generated automatically; NAME is filled from attribute "Name" |
| 5 | 39514 | Dev__2 | 39508 | |
| 6 | 39515 | Dev__3 | 39508 | |
| 7 | 39516 | Dev__4 | 39508 | |

NC_PARAMS

| | ATTR_ID | OBJECT_ID | VALUE | |
|---|---|---|---|---|
| 1 | 39505 | 39513 | 1 | Value of attribute Device ID of device with Name "Dev__1" |
| 2 | 39505 | 39514 | 2 | Value of attribute Device ID of device with Name "Dev__2" |
| 3 | 39505 | 39515 | 3 | Value of attribute Device ID of device with Name "Dev__3" |
| 4 | 39505 | 39516 | 4 | Value of attribute Device ID of device with Name "Dev__4" |
| 5 | 39506 | 39510 | 1 | Value of attribute Parent ID of card with Name "Card__77221-77228" |
| 6 | 39506 | 39511 | 3 | Value of attribute Parent ID of card with Name "Card__77223-77226" |
| 7 | 39506 | 39512 | 2 | Value of attribute Parent ID of card with name "Card__77224-77225" |
| 8 | 39507 | 39510 | 1 | Value of attribute Parent ID of card with Name "Card__77221-77228" |
| 9 | 39507 | 39511 | 3 | Value of attribute Parent ID of card with Name "Card__77223-77226" |
| 10 | 39507 | 39512 | 4 | Value of attribute Parent ID of card with name "Card__77224-77225" |

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

Any of the systems described herein can include clients and servers. A client and a server are generally remote from each other and typically interact through a communication network. The relationship of client and server arises by virtue of computer programs running on the respective computers and having a client-server relationship to each other.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client, computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The network device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computer implemented method for declarative and unified data transition, the method comprising:

determining a unified configuration for a knowledge domain, the unified configuration comprising one or more predicates for one or more relationships between one or more system objects, the unified configuration being a single configuration file, the one or more predicates identifying a first system object and a second system object, a multiplicity of the relationship between the first system object and the second system object and one of a plurality of predetermined directions indicating a direction of input data between the first system object and the second system object, each system object including a primary key attribute that uniquely identifies the system object, the unified configuration further including one or more validation rules, transformation rules, reconciliation rules and the one or more predicates;

validating the input data based on one or more validation rules based on the one or more predicates of the unified configuration;

transforming first input data based on one or more transformation rules generated based on the one or more predicates of the unified configuration, the first input data comprising information associated with the one or more system objects or the one or more relationships between the one or more system objects defined by the unified configuration;

reconciling the transformed data with the destination database based on one or more reconciliation rules generated based on the one or more predicates of the unified configuration;

transforming second input data based on one or more second transformation rules generated based on the one or more predicates of the unified configuration;

transforming the first and second transformed input data based on one or more combined transformation rules generated based on the one or more predicates of the unified configuration; and reconciling the first and second combined transformed input data with the one or more destination database based on one or more combined reconciliation rules generated based on the one or more predicates of the unified configuration.

2. The method of claim 1, further comprising automatically modifying the input data based on the validation of the input data to remove at least one validation error associated with the input data.

3. The method of claim 1, further comprising extracting the input data from one or more source databases based on one or more extraction rules.

4. The method of claim 3, further comprising generating the one or more extraction rules based on the one or more predicates of the unified configuration.

5. The method of claim 3, wherein the extracting the input data from the one or more source databases and the reconciling the transformed data with the destination database occur relative to each other in real-time.

6. The method of claim 1, further comprising:
generating one or more second reconciliation rules based on the one or more predicates of the unified configuration, the one or more second reconciliation rules associated with a second destination database defined by the unified configuration; and
reconciling the transformed data with the second destination database based on the one or more second reconciliation rules.

7. The method of claim 1, wherein the transforming the input data further comprises joining at least one part of the input data with at least one other part of the input data based on the one or more transformation rules.

8. The method of claim 1, wherein the transforming the input data further comprises merging at least one part of the input data with at least one other part of the input data based on the one or more transformation rules.

9. The method of claim 1, further comprising:
generating one or more post-transformation validation rules based on the one or more predicates of the unified configuration; and
validating the transformed data based on the one or more post-transformation validation rules.

10. The method of claim 1, further comprising merging the reconciled data with data stored on the destination database.

11. The method of claim 1, further comprising appending the reconciled data with data stored on the destination database.

12. The method of claim 1, wherein the input data comprises one or more table sets, one or more tables, one or more table fields, or any combination thereof.

13. The method of claim 1, wherein the destination database comprises an operational support system database, a healthcare system database, an information technology database, or any combination thereof.

14. A non-transitory computer readable storage medium including instructions, which when executed by a data processing apparatus causes the data processing apparatus to:
determine a unified configuration for a knowledge domain, the unified configuration comprising one or more predicates for one or more relationships between one or more system objects, the unified configuration being a single configuration file, the one or more predicates identifying a first system object and a second system object, a multiplicity of the relation between the first system object and the second system object and one of a plurality of predetermined directions indicating a direction of input data between the first system object and the second system object, each system object including a primary key attribute that uniquely identifies the system object, the unified configuration further including one or more validation rules, transformation rules, reconciliation rules and the one or more predicates;
validate the input data based on one or more validation rules generated based on the one or more predicates of the unified configuration;
transform first input data based on one or more transformation rules generated based on the one or more predicates of the unified configuration, the first input data comprising information associated with the one or more system objects or the one or more relationships between the one or more system objects defined by the unified configuration;
reconcile the transformed data with the destination database based on one or more reconciliation rules generated based on the one or more predicates of the unified configuration;
transform second input data based on the one or more second transformation rules generated based on the one or more predicates of the unified configuration;
transform the first and second transformed input data based on the one or more combined transformation rules generated based on the one or more predicates of the unified configuration; and
reconcile the first and second combined transformation input data with the one or more destination database based on the one or more combined reconciliation rules generated based on the one or more predicates of the unified configuration.

15. A system for declarative and unified data transition, the system comprising:
at least one processor and a memory storing instruction that, when executed by the at least one processor, causes the at least one processor to:
determine a unified configuration for knowledge domain, the unified configuration comprising one or more predicates one or more relationships between one or more system objects, the unified configuration being a single configuration file, the one or more predicates identifying a first system object and a second system object, a multiplicity of the relation between the first system object and the second system object and one of a plurality of predetermined directions indicating a direction of input data between the first system object and the second system object, each system object including a primary key attribute that uniquely identifies the system object, the unified configuration further including one or more validation rules, transformation rules, reconciliation rules and the one or more predicates;
validate the input data based on one or more validation rules generated based on the one or more predicates of the unified configuration;
generate one or more transformation rules based on the one or more predicates of the unified configuration;
transform first input data based on one or more transformation rules generated based on the one or more predicates of the unified configuration, the first input data comprising information associated with the one or more system objects or the one or more relationships between the one or more system objects defined by the unified configuration;

reconcile the transformed data with the destination database based on one or more reconciliation rules generated based on the one or more predicates of the unified configuration;

transform second input data based on the one or more second transformation rules generated based on the one or more predicates of the unified configuration;

transform the first and second transformed input data based on the one or more combined transformation rules generated based on the one or more predicates of the unified configuration; and reconcile the first and second combined transformation input data with the one or more destination database based on the one or more combined reconciliation rules generated based on the one or more predicates of the unified configuration.

16. The system of claim 15, wherein the at least one processor is further configured to automatically modify the input data based on the validation of the input data to remove at least one validation error associated with the input data.

17. The system of claim 15, wherein the instructions that, when executed by the at least one processor, further cause the at least one processor to extract the input data from one or more source databases based on one or more extraction rules.

18. The system of claim 17, wherein the instructions that, when executed by the at least one processor, further cause the at least one processor to generate the one or more extraction rules based on the one or more predicates of the unified configuration.

19. The system of claim 15, wherein:

the at least one processor is further configured to:

generate one or more second reconciliation rules based on the one or more predicates of the unified configuration, the one or more second reconciliation rules associated with a second destination database defined by the unified configuration; and reconcile the transformed data with the second destination database based on the one or more second reconciliation rules.

20. The system of claim 15, wherein the at least one processor is further configured to join at least one part of the input data with at least one other part of the input data based on the one or more transformation rules.

21. The system of claim 15, wherein the at least one processor is further configured to merge at least one part of the input data with at least one other part of the input data based on the one or more transformation rules.

22. The system of claim 15, wherein the at least one processor is further configured to modify at least one part of the input data based on the one or more transformation rules.

23. The system of claim 15, wherein the instructions that, when executed by the at least one processor, further cause the at least one processor to:

generate one or more post-transformation validation rules based on the one or more predicates of the unified configuration; and validate the transformed data based on the one or more post-transformation validation rules.

24. The system of claim 15, wherein the at least one processor is further configured to merge the reconciled data with data stored on the destination database.

25. The system of claim 15, wherein the at least one processor is further configured to append the reconciled data with data stored on the destination database.

\* \* \* \* \*